(12) United States Patent
Meng et al.

(10) Patent No.: US 12,488,625 B2
(45) Date of Patent: Dec. 2, 2025

(54) LIVENESS DETECTION METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Jia Meng, Shenzhen (CN); Dongheng Zhang, Shenzhen (CN); Jian Zhang, Shenzhen (CN); Mingwei Bi, Shenzhen (CN); Xinzhe Deng, Shenzhen (CN); Shouhong Ding, Shenzhen (CN); Jilin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 386 days.

(21) Appl. No.: 18/319,114

(22) Filed: May 17, 2023

(65) Prior Publication Data
US 2023/0290187 A1 Sep. 14, 2023

Related U.S. Application Data

(63) Continuation of application No. PCT/CN2022/097110, filed on Jun. 6, 2022.

(30) Foreign Application Priority Data

Jun. 15, 2021 (CN) .......................... 202110661492.9

(51) Int. Cl.
*G06V 40/40* (2022.01)
*G01S 15/58* (2006.01)
(Continued)

(52) U.S. Cl.
CPC .............. *G06V 40/45* (2022.01); *G01S 15/58* (2013.01); *G01S 15/86* (2020.01); *G06T 7/246* (2017.01);
(Continued)

(58) Field of Classification Search
CPC .... G06V 40/45; G06V 10/776; G06V 10/806; G06V 40/171; G06V 40/172;
(Continued)

(56) References Cited

U.S. PATENT DOCUMENTS

2017/0220854 A1 8/2017 Yang et al.

FOREIGN PATENT DOCUMENTS

| CN | 112053690 A | * | 12/2020 | ........... G06F 18/253 |
|----|-------------|---|---------|------------------------|
| CN | 112328999 A | * | 2/2021  | ........... G06F 18/254 |

(Continued)

OTHER PUBLICATIONS

Melnikov et al.: "Audiovisual Liveness Detection", Springer Nature Link, submitted Jan. 1, 2015, [retrieved on Jul. 25, 2025]. Retrieved from the internet <https://link.springer.com/chapter/10.1007/978-3-319-23234-8_59> (Year: 2015).*

(Continued)

*Primary Examiner* — Andrew M Moyer
*Assistant Examiner* — Alexander Joseph Vaughn
(74) *Attorney, Agent, or Firm* — Anova Law Group, PLLC

(57) ABSTRACT

A liveness detection method includes: obtaining a reflected audio signal and video data of a object in response to receiving a liveness detection request; performing signal processing and time-frequency analysis on the reflected audio signal to obtain time-frequency information of a processed audio signal, and extracting motion trajectory information of the object from the video data; respectively extract features from the time-frequency information and the
(Continued)

motion trajectory information to obtain an audio feature and a motion feature of the object; calculating first global attention information of the object according to the audio feature, and calculating second global attention information of the object according to the motion feature; and fusing the first global attention information with the second global attention information to obtain fused global information, and determining a liveness detection result of the object based on the fused global information.

20 Claims, 5 Drawing Sheets

(51) Int. Cl.
| | |
|---|---|
| *G01S 15/86* | (2020.01) |
| *G06T 7/246* | (2017.01) |
| *G06V 10/776* | (2022.01) |
| *G06V 10/80* | (2022.01) |
| *G06V 40/16* | (2022.01) |

(52) U.S. Cl.
CPC .......... *G06V 10/776* (2022.01); *G06V 10/806* (2022.01); *G06V 40/171* (2022.01); *G06T 2207/10016* (2013.01); *G06T 2207/30201* (2013.01); *G06T 2207/30241* (2013.01); *G06V 40/172* (2022.01)

(58) Field of Classification Search
CPC ...... G06V 20/95; G06V 40/40; G06V 10/431; G06V 10/82; G06V 20/46; G01S 15/58; G01S 15/86; G01S 7/539; G01S 15/88; G06T 7/246; G06T 2207/10016; G06T 2207/30201; G06T 2207/30241; G06F 18/253

See application file for complete search history.

(56) References Cited

FOREIGN PATENT DOCUMENTS

| | | |
|---|---|---|
| CN | 112559835 A | 3/2021 |
| CN | 113505652 A | 10/2021 |

OTHER PUBLICATIONS

China National Intellectual Property Administration (CNIPA) Office Action 1 for 202110661492.9, Jan. 4, 2023 17 Pages (including translation).

The World Intellectual Property Organization (WIPO) International Search Report for PCT/CN2022/097110 Aug. 18, 2022 13 Pages (including translation).

* cited by examiner

LIVENESS DETECTION METHOD AND APPARATUS, ELECTRONIC DEVICE, AND STORAGE MEDIUM

CROSS-REFERENCES TO RELATED APPLICATIONS

This application is a continuation application of PCT Patent Application No. PCT/CN2022/097110, entitled "LIVING BODY DETECTION METHOD AND APPARATUS, AND ELECTRONIC DEVICE AND STORAGE MEDIUM" and filed on Jun. 6, 2022, which claims priority to Chinese Patent Application No. 202110661492.9, entitled "LIVENESS DETECTION METHOD AND APPARATUS, ELECTRONIC DEVICE, AND STORAGE MEDIUM" filed on Jun. 15, 2021, the entire contents of both of which are incorporated herein by reference.

FIELD OF THE TECHNOLOGY

The present disclosure relates to the technical field of computers, and in particular to a liveness detection method and apparatus, an electronic device, and a storage medium.

BACKGROUND OF THE DISCLOSURE

With the rapid development of computer technologies and the continuous improvement of face recognition technologies, face recognition has been widely used. However, a face recognition system is easily attacked by fake faces, such as photo attacks or video attacks, resulting in security problems. Therefore, it is very important to perform liveness detection before face recognition, which can effectively improve the security of face recognition.

Liveness detection is a method for determining real physiological characteristics of an object in some authentication scenarios. For example, in face recognition applications, in liveness detection, by means of one or any combination of actions, such as blinking, opening the mouth, shaking the head and nodding, face key point positioning, face tracking and other technologies can be used for verifying whether a user is a real live person, which can effectively prevent photos, face changing, masks, shielding, screen re-shooting and other common attack means. However, existing liveness detection schemes are poor in effect, which greatly affects the accuracy of face recognition.

SUMMARY

Embodiments of the present disclosure provide a liveness detection method and apparatus, an electronic device, and a storage medium, which can effectively improve the accuracy of liveness detection.

An embodiment of the present disclosure provides a liveness detection method, which includes: obtaining a reflected audio signal and video data of an object to be detected in response to receiving a liveness detection request; performing signal processing on the reflected audio signal to obtain a processed audio signal, and performing time-frequency analysis on the processed audio signal to obtain time-frequency information of the processed audio signal; extracting motion trajectory information of the object from the video data; extracting features respectively from the time-frequency information and the motion trajectory information to obtain an audio feature and a motion feature of the object; calculating first global attention information of the object according to the audio feature, and calculating second global attention information of the object according to the motion feature, the first global attention information indicating a global correlation of the audio feature, and the second global attention information indicating a global correlation of the motion feature; and fusing the first global attention information with the second global attention information to obtain fused global information, and determining a liveness detection result of the object based on the fused global information.

An embodiment of the present disclosure further provides a liveness detection apparatus, which includes: an obtaining unit, configured to obtain a reflected audio signal and video data of an object in response to receiving a liveness detection request; an analysis unit, configured to perform signal processing on the reflected audio signal to obtain a processed audio signal, perform time-frequency analysis on the processed audio signal to obtain time-frequency information of the processed audio signal, and extract motion trajectory information of the object from the video data; an extraction unit, configured to extract features respectively from the time-frequency information and the motion trajectory information to obtain an audio feature and a motion feature of the object; a calculation unit, configured to calculate first global attention information of the object according to the audio feature, and calculate second global attention information of the object according to the motion feature, the first global attention information indicating a global correlation of the audio feature, and the second global attention information indicating a global correlation of the motion feature; and a fusion unit, configured to fuse the first global attention information with the second global attention information to obtain fused global information, and determine a liveness detection result of the object based on the fused global information.

In addition, an embodiment of the present disclosure further provides a non-transitory computer-readable storage medium. The computer-readable storage medium stores a plurality of instructions, and the instructions are loaded by at least one processor to perform any liveness detection method provided by the embodiments of the present disclosure.

In addition, an embodiment of the present disclosure further provides an electronic device, which includes at least one memory, at least one processor and a computer program stored on the at least one memory and being executable by the at least one processor; and the at least one processor, when executing the program, implements any liveness detection method provided by the embodiments of the present disclosure.

The embodiments of the present disclosure can effectively improve the accuracy of liveness detection.

BRIEF DESCRIPTION OF THE DRAWINGS

In order to illustrate the technical solutions in the embodiments of the present disclosure more clearly, the following briefly introduces the accompanying drawings required in the description of the embodiments. Obviously, the accompanying drawings described below are only some embodiments of the present disclosure. Those of ordinary skill in the art can also obtain other drawings according to the drawings without any creative work.

DESCRIPTION OF EMBODIMENTS

Figure 1A:
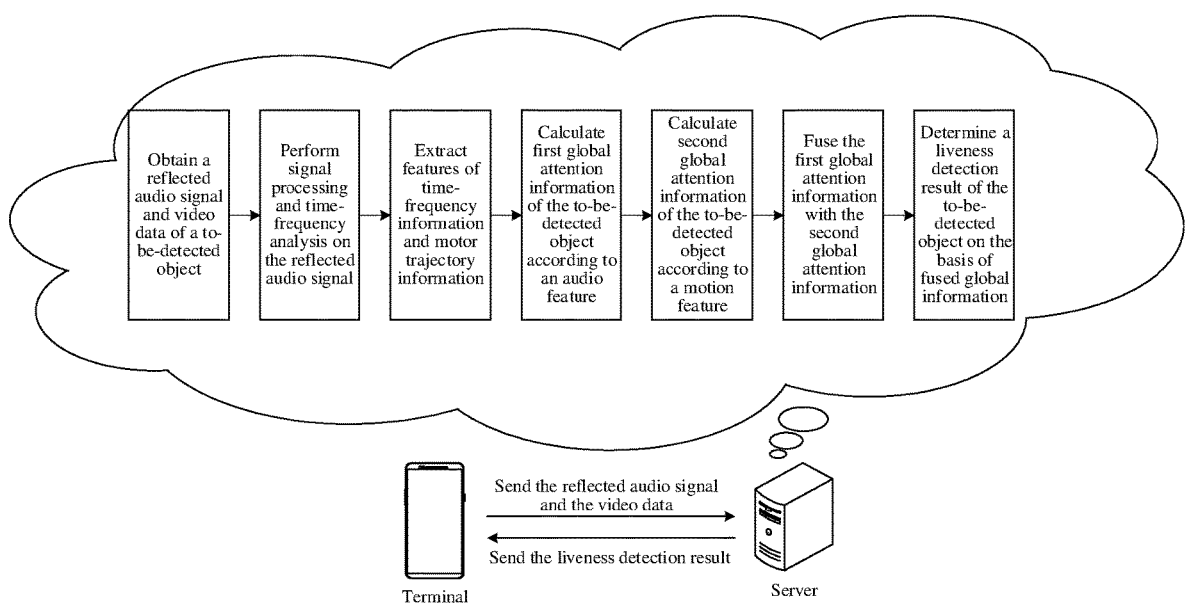
FIG. 1a is a schematic diagram of a scenario of a liveness detection method provided by an embodiment of the present disclosure.

The technical solutions in embodiments of the present disclosure are clearly and completely described in the following with reference to the accompanying drawings in the embodiments of the present disclosure. Apparently, the described embodiments are merely some rather than all of the embodiments of the present disclosure. Based on the embodiments in the present disclosure, all other embodiments obtained by those skilled in the art without creative work all fall within the protection scope of the present disclosure.

The principles of the present disclosure are illustrated as being implemented in a suitable computing environment. In the following description, the embodiments of the present disclosure are described with reference to steps and symbols of operations that are performed by one or more computers, unless indicated otherwise. Therefore, these steps and operations will be referred to several times as being performed by a computer, which as referred to herein includes operations performed by a computer processing unit that is an electronic signal representing data in a structured form. This operation transforms the data or maintains it at a position in a memory system of the computer, which may reconfigure or otherwise alter the operation of the computer in a manner well known to those skilled in the art. Data structures in which the data is maintained are physical locations of the memory that have particular properties defined by the format of the data. However, the principles of the present disclosure are described in the foregoing text and are not meant to be a limitation as those skilled in the art will recognize that the various steps and operations described below may also be implemented in hardware.

As used herein, the term "unit" and "module" may be viewed as a software object executed on the computing system. The various components, units, modules, engines, and services described herein may be viewed as implementation objects on the computing system. However, it falls within the scope of the present disclosure that the apparatus and method described herein can be implemented in software, hardware, or both software and hardware. The various components, units, modules, engines, and services can be implemented by software stored in memory or non-transitory computer-readable medium. The software (e.g., software unit, module, engine, etc.) stored in the memory or non-transitory computer-readable medium include computer instructions or codes and can run on a processor or circuitry (e.g., ASIC, PLA, DSP, FPGA, or any other integrated circuit) capable of executing computer instructions or computer code. The various components, units, modules, engines, and services can also be implemented by hardware such as processor or circuitry. Implementation based on a combination of software and hardware is also contemplated.

In the present disclosure, the terms "first", "second", "third", and the like are intended to distinguish between different objects but do not indicate a particular order.

Furthermore, the terms "include", "have", and any variations thereof are intended to cover a non-exclusive inclusion. For example, a process, a method, a system, a product, or a device that includes a series of steps or units is not limited to the listed steps or units, but some embodiments further include an unlisted step or unit, or some embodiments further include another inherent step or unit of the process, the method, the product, or the device.

Embodiment mentioned in the specification means that particular features, structures, or characteristics described with reference to the embodiment may be included in at least one embodiment of the present disclosure. The term appearing at different positions of the specification may not refer to the same embodiment or an independent or alternative embodiment that is mutually exclusive with another embodiment. A person skilled in the art explicitly or implicitly understands that the embodiments described in the specification may be combined with other embodiments.

Embodiments of the present disclosure provide a liveness detection method and apparatus, an electronic device and a storage medium. The liveness detection apparatus can be integrated in an electronic device. The electronic device may be a server, a terminal, or the like.

The liveness detection method provided by the embodiments of the present disclosure relates to a computer vision technology in the field of artificial intelligence. The computer vision technology of artificial intelligence can be used to extract features of time-frequency information and motion trajectory information, and then the extracted features are used to perform liveness judgment on the to-be-detected object, so as to realize liveness detection of the to-be-detected object.

For example, as shown in FIG. 1*a*, first, a server integrated with a liveness detection apparatus can obtain, in response to receiving a liveness detection request, a reflected audio signal and video data of a to-be-detected object that are sent by a terminal; then perform signal processing on the reflected audio signal to obtain a processed audio signal, perform time-frequency analysis on the processed audio signal to obtain time-frequency information of the processed audio signal, and extract motion trajectory information of the to-be-detected object from the video data; respectively extract features from the time-frequency information and the motion trajectory information to obtain an audio feature and a motion feature of the to-be-detected object; calculate first global attention information of the to-be-detected object according to the audio feature, and calculate second global attention information of the to-be-detected object according to the motion feature, the first global attention information being feature information concerned with a global correlation of the audio feature, and the second global attention information being feature information concerned with a global correlation of the motion feature; and fuse the first global attention information with the second global attention information to obtain fused global information, and determine a liveness detection result of the to-be-detected object based on the fused global information. This scheme can perform the signal processing and the time-frequency analysis on the reflected audio signal to obtain the time-frequency information, extract the motion trajectory information from the video data, and perform cross-modal fusion on the time-frequency information with the motion trajectory information, thereby effectively improving accuracy of liveness detection. In addition, the embodiments of the present disclosure can perform consistency judgment on the reflected audio signal and the video data after the liveness detection, which further improves the accuracy of the liveness detection.

The embodiments of the present disclosure are respectively described in detail below. A description order of the following embodiments is not construed as a limitation on a preferred order of the embodiments.

This embodiment will be described from the perspective of a liveness detection apparatus. The liveness detection apparatus can be specifically integrated in an electronic device. The electronic device may be a server, a terminal or other devices. The terminal may include a mobile phone, a tablet, a notebook computer, and a Personal Computer (PC).

An embodiment of the present disclosure provides a liveness detection method, which includes: obtaining a reflected audio signal and video data of a to-be-detected object in response to receiving a liveness detection request; performing signal processing on the reflected audio signal to obtain a processed audio signal, performing time-frequency analysis on the processed audio signal to obtain time-frequency information of the processed audio signal, and extracting motion trajectory information of the to-be-detected object from the video data; extracting features respectively from the time-frequency information and the motion trajectory information to obtain an audio feature and a motion feature of the to-be-detected object; calculating first global attention information of the to-be-detected object according to the audio feature, and calculating second global attention information of the to-be-detected object according to the motion feature, the first global attention information being feature information concerned with a global correlation of the audio feature, and the second global attention information being feature information concerned with a global correlation of the motion feature; and fusing the first global attention information with the second global attention information to obtain fused global information, and determining a liveness detection result of the to-be-detected object based on the fused global information.

Figure 1B:
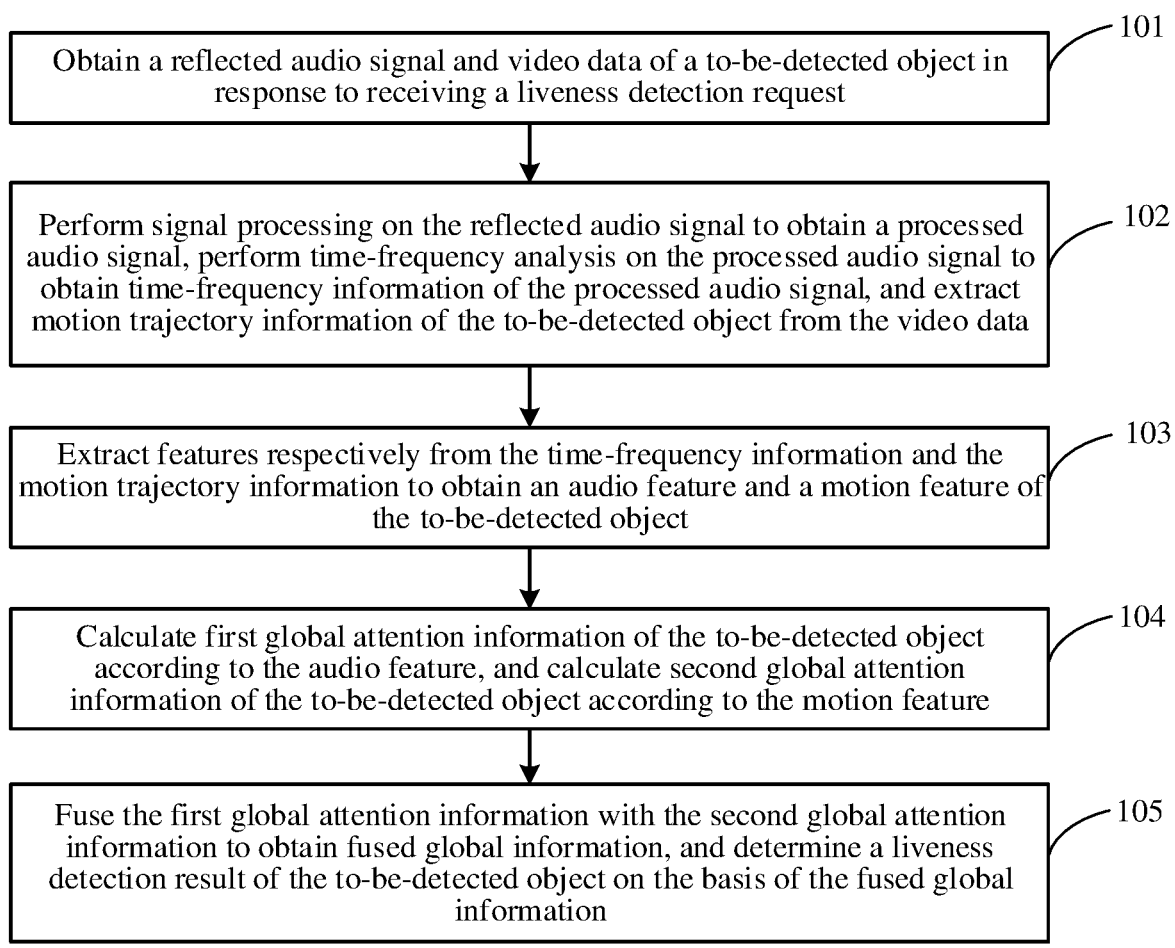
FIG. 1b is a first flowchart of a liveness detection method provided by an embodiment of the present disclosure.

As shown in FIG. 1b, a specific flow of the liveness detection method may include the following steps 101-105:

101. Acquire a reflected audio signal and video data of a to-be-detected object in response to receiving a liveness detection request.

The to-be-detected object may refer to an object that needs liveness detection, for example, an animal or a person. The reflected audio signal may refer to an audio signal reflected by the to-be-detected object. For example, a liveness detection apparatus may transmit an audio signal to the to-be-detected object, and the liveness detection apparatus receives a reflected audio signal reflected by the to-be-detected object after the audio signal reaches the to-be-detected object. The video data may refer to a video recorded for a current behavior of the to-be-detected object.

In the field of biological motion perception, analysis of micro-Doppler signals generated by the limbs of a target liveness (such as a person) can help to recognize a behavior, an emotion, a height, a weight and even the gender of the person. In the field of audio signal classification and research, analysis of audio signals with a micro-Doppler effect can help to distinguish different movements of the target liveness. For example, in the field of through-wall radar detection, since the existence of a wall does not change a micro-Doppler characteristic mode of a target, analysis of a reflected micro-Doppler signal can estimate the heartbeat, breathing and even vibrations of the throat of a person behind the wall. For another example, in the process of liveness detection, after a user completes an action (such as opening the mouth, shaking the head, nodding or other gestures) that is randomly prompted by a terminal, useful information of a micro-Doppler signal can be extracted by modulating and differentiating an echo signal (namely, a reflected audio signal), and short time Fourier transform time-frequency analysis is further performed on a phase of the signal. Thus, different action types and numbers of times of actions can be effectively distinguished. A useful range of the signal is obtained by cutting by analyzing the video data of the action performed by the user. Since the micro-Doppler signal generated when the user performs the action can be extracted by processing the echo signal and converted into a time-frequency signal, and then action detection is performed on the recorded video to find a time interval during which the action occurs. The time-frequency signal is cut using this interval, and then a signal after cutting and the motion trajectory information extracted from the video data are fused. Thus, fused information is used to achieve accurate liveness detection of the user.

The micro-Doppler effect can mean that when a target has a radial motion relative to a radar, the target or a component of the target also has a small-amplitude component motion relative to the radar. This phenomenon is referred to as inching. The small amplitude here is relative to a radial distance between the target and the radar. For a single-scattering target, inching is reflected in a non-uniform motion of the target. For a multi-scattering target, inching is reflected in a nonrigid motion of the target. The nonrigid motion means that there is still a relative motion between the various components of the target. In addition to centroid translation, the target or any structural component on the target also has vibration, rotation, an acceleration motion and the like. These micro motions will cause additional frequency modulation on a received signal, and will generate an offset frequency near a Doppler frequency shift generated by a movement of a target main body. Because of the uniqueness of micro-Doppler, micro-Doppler frequency shifts are different. A micro-Doppler signal has three important parameters, including an angular frequency, a Doppler amplitude and an initial phase.

For example, an initial audio signal may be transmitted to the to-be-detected object, and the reflected audio signal reflected by the to-be-detected object may be received. Meanwhile, the video data of the to-be-detected object is acquired. For example, specifically, an audio output device can be used to transmit the initial audio signal to the to-be-detected object; an audio input device can be used to receive the reflected audio signal reflected by the to-be-detected object; and an image acquisition device can be used to acquire the video data of the to-be-detected object.

For example, when a liveness detection apparatus is integrated in a server, an audio output device of a terminal can transmit the initial audio signal to the to-be-detected object, and an audio input device of the terminal can receive the reflected audio signal reflected by the to-be-detected object. At the same time, an image acquisition device of the terminal can acquire the video data of the to-be-detected object. The reflected audio signal received by the audio input device of the terminal and the video data acquired by the image acquisition device are sent to the server, so that the liveness detection apparatus of the server can perform liveness detection on the to-be-detected object based on the reflected audio signal and the video data.

For example, when a liveness detection apparatus is integrated in a terminal, an audio output device of the terminal can transmit the initial audio signal to the to-be-detected object; an audio input device of the terminal can receive the reflected audio signal reflected by the to-be-detected object. At the same time, an image acquisition device of the terminal can acquire the video data of the to-be-detected object, Then, the liveness detection apparatus of the terminal performs liveness detection on the to-be-detected object based on the reflected audio signal and video data.

Since this scheme can use the audio output device, the audio input device and the image acquisition device on the terminal to obtain the reflected audio signal and the video data required for the liveness detection, without additional hardware devices, this scheme can be implemented on an ordinary mobile terminal without relying on special hardware, which greatly saves hardware resources and improves the convenience, implementability and operability of the liveness detection.

The audio output device can be an earpiece, a speaker, and the like. The audio input device can be a microphone and the like. The image acquisition device can be a camera and the like.

Before being transmitted to the to-be-detected object, the initial audio signal can be generated first. In order to improve the accuracy of liveness detection, a generated audio can be obtained by superimposing a plurality of tones. In addition, in order to avoid an audio playback attack, a carrier frequency of the generated audio can be randomized, so that an attacker cannot bypass the current detection by replaying previously recorded audios. For example, it may include: superimposing target audio signals of a plurality of tones to obtain a superimposed audio signal; and randomizing a carrier frequency of the superimposed audio signal, and generating the initial audio signal.

For example, the target audio signals of the plurality of tones may be superimposed in the following manner: $\Sigma_{k=1}^{N} 2A \cos 2\pi f_k t$, where 2A is an amplitude; $f_k$ is the carrier frequency of the signal; and N is a total quantity of sub-carriers.

102. Perform signal processing on the reflected audio signal to obtain a processed audio signal, perform time-frequency analysis on the processed audio signal to obtain time-frequency information of the processed audio signal, and extract motion trajectory information of the to-be-detected object from the video data.

The processed audio signal may include at least one audio frame signal, and the video data may include at least one image frame. In this embodiment, the processed audio signal may include a plurality of audio frame signals, and the video data may include a plurality of image frames.

The quality of signal obtaining is crucial to the accuracy of liveness detection. In actual liveness detection, an interference and a noise introduced in signal propagation will weaken the audio signal reflected by the to-be-detected object and affect the accuracy of liveness detection. Therefore, in order to enhance the reflected audio signal from the to-be-detected object, space-domain enhancement processing can be performed on the reflected audio signal, so that the signal can be enhanced according to a position of the to-be-detected object, to suppress the interference and the noise and achieve more accurate liveness detection. For example, it may specifically include: performing space-domain enhancement processing on the reflected audio signal to obtain a space-domain enhancement signal; and performing signal extraction processing on the space-domain enhancement signal to obtain the processed audio signal, and performing the time-frequency analysis on the processed audio signal to obtain the time-frequency information of the processed audio signal.

There are many ways to perform the space-domain enhancement processing on the reflected audio signal. For example, quadrature demodulation (IQ modulation) can be first performed on the reflected audio signal, and interference signals from other paths can be then removed. Only signals related to the motion of the to-be-detected object are reserved, and the space-domain enhancement processing is then performed on the signals related to the motion of the to-be-detected object. The IQ modulation is to divide data into two channels for carrier modulation, and the two channels of carriers are orthogonal to each other. I refers to in-phase and q refers to quadrature.

For example, the step of "performing space-domain enhancement processing on the reflected audio signal to obtain a space-domain enhancement signal" may specifically include: performing quadrature demodulation on the reflected audio signal to obtain an analytic signal; and performing the space-domain enhancement processing on the analytic signal by using a preset space-domain matrix to obtain the space-domain enhancement signal.

The preset space-domain matrix can be set in many ways. For example, the preset condition can be flexibly set according to requirements of practical applications, or can be preset and stored in the electronic device. In addition, the preset space-domain matrix may be configured in the electronic device, or may be stored in a memory and sent to the electronic device.

For example, the quadrature demodulation is performed on the received reflected audio signal to obtain a complex signal x on different carriers, namely, the analytic signalx. In the liveness detection process, an action of the to-be-detected object plays a role in modulating the audio signal. The reflected audio signal is composed of multiple paths, including a reflection path from the to-be-detected object, a solid propagation path, an air propagation path, and reflection paths of surrounding objects.

The initial audio signal played by the audio output device is regarded as a carrier signal, and the reflected audio signal recorded by the audio input device is regarded as a superposition of a plurality of baseband signals subjected to phase shift modulation. Since the generated audio is a superposition of multiple audio signals with different frequencies, the initial audio signal played by the audio output device can be regarded as a superposition of the baseband signals with different frequencies. Since a recorded signal is synchronized with a played signal, the recorded signal can be demodulated using coherent detection, to obtain an I (in-phase) component and a Q (quadrature) component of the baseband signal on the carrier frequency, thus obtaining baseband signals I(t) and Q(t). In order to improve the accuracy of recognition, interference signals of other paths need to be removed, and only the signals related to the motion of the to-be-detected object are reserved. A dynamic interference signal refers to an audio signal reflected by another moving object nearby. Therefore, a cut-off frequency of a low-pass filter for coherent detection can be set to be a preset value to eliminate a dynamic interference while demodulating a baseband signal. A resulting complex signal is recorded as x, $$x=I(t)+Q(t)$$

The original signal is then transformed to range domain by using the spatial signal enhancement processing method. If an expression of the signal subjected to quadrature demodulation is x, an expression of the spatial signal enhancement processing process can be as follows:

$$y=Ax$$

where y is the output space-domain enhancement signal, and A is a guide matrix (namely, the preset space-domain enhancement signal) of the space-domain enhancement signal. The expression can be as follows:

$$A=[a(\tau_1),a(\tau_2), \ldots ,a(\tau_S)]$$

$$a(\tau)=e^{j2\pi f\tau}$$

where $\tau$ is a propagation period of an ultrasonic wave in a medium from transmission to receiving; f is a signal frequency; j is an imaginary unit; and S is a preset possible propagation time of the signal. After the processing by the above formula, each point of the output spatial signal y represents a signal from different spatial positions.

In this embodiment, the step of "performing signal extraction processing on the space-domain enhancement signal to obtain the processed audio signal, and performing time-frequency analysis on the processed audio signal to obtain the time-frequency information of the processed audio signal" may specifically include: differentiating the space-domain enhancement signal based on a time axis of the space-domain enhancement signal to obtain a differentiated audio signal; determining propagation time of the to-be-detected object in a medium based on amplitude of the differentiated audio signal; extracting a target audio signal from the space-domain enhancement signal according to the propagation time, and performing high-pass filtering on the target audio signal to obtain the processed audio signal; and performing short time Fourier transform on the processed audio signal to obtain the time-frequency information of the processed audio signal.

For example, in order to eliminate interference in an environment, such as leakage of a signal that is directly from the audio output device to the audio input device, y can be differentiated along the time axis. That is, $$y'_t=y_{t+1}-y_t$$

where t is a time stamp of the space-domain enhancement signal. Then, the propagation time of the reflected audio signal of the to-be-detected object in the medium is determined according to the amplitude of the space-domain enhancement signal, and high-pass filtering is performed on the signal extracted within the propagation time. The short time Fourier transform (STFT) is performed to obtain a time-frequency map of the processed audio signal, that is, the time-frequency information of the processed audio signal.

The STFT may refer to multiplying a fixed window function w(t) that is sufficiently narrow in time width with a time signal x(t) to extract signals that remains stable within a certain time interval; then performing Fourier transform on the extracted signals within the time interval to obtain spectral information of the signals within the time width; and finally moving the fixed window function w(t) along the time axis, to obtain Fourier transforms of the signals at different times. A set of these Fourier transforms can describe a relation where a spectrum of a signal varies over time.

In this embodiment, in order to further eliminate the interference and improve the accuracy of liveness detection, the time-frequency map of the processed audio signal can be cut by analyzing the video data of the action. For example, specifically, motion interval cutting may be performed on the time-frequency information of the processed audio signal based on the video data to obtain time-frequency information after cutting. The step of "extracting features respectively from the time-frequency information and the motion trajectory information to obtain an audio feature and a motion feature of the to-be-detected object" may specifically include: extracting features respectively from the time-frequency information after cutting and the motion trajectory information to obtain the audio feature and the motion feature of the to-be-detected object.

Since liveness detection based only on an audio signal is less secure in the face of attacks specifically aimed at the audio signal, and changes of the processed audio signal of the to-be-detected object depends on a current action performed by the to-be-detected object. Therefore, the motion information in the video data can be extracted, so that the motion information in a visual mode can be used for combined judgment to improve the security and accuracy of liveness detection. For example, the video data includes at least one image frame. It may specifically include: performing key point detection on each image frame in the video data to obtain key point information corresponding to each image frame; and determining the motion trajectory information of the to-be-detected object based on the key point information of each image frame.

In this embodiment, the step of "determining the motion trajectory information of the to-be-detected object based on the key point information of each image frame" may specifically include: differentiating two adjacent image frames to obtain a motion vector of the key point information between the two adjacent image frames; and determining the motion trajectory information of the to-be-detected object based on all the motion vectors of the video data.

For example, a target part in a target region of the to-be-detected object is taken as an example. $\{V_0, V_1, \ldots, V_M\}$ is set as an acquired video sequence. Target region detection and target region key point positioning are performed on each image frame in the video sequence. K key point positions corresponding to the target part in each image frame are extracted, and a target part key point sequence $\{L_0, L_1, \ldots L_M\}$ of all the image frames is obtained, where the target part key point sequence of an mth image frame is $L_m=\{P_1, P_2, \ldots, P_K\}$, and $P_k=(x_k,y_k)$ is a coordinate of a kth key point on this frame of image. The key point sequences of adjacent image frames are differentiated to obtain a motion vector, namely, $MV_m=L_{m+1}-L_m$, between the two frames. A resulting motion vector sequence reflects a motion trajectory $\{MV_0, MV_2, \ldots, MV_{M-1}\}$ of key points of the target part when the target part performs an action. There are many ways to perform the target region detection and the target region key point positioning on each image frame. For example, a multi-task convolutional neural network (MTCNN) can be used to perform the target region detection, target key point detection, and the like, which will not be described in detail here.

103. Extract features respectively from the time-frequency information and the motion trajectory information to obtain an audio feature and a motion feature of the to-be-detected object.

The time-frequency information (such as the time-frequency map) of the processed audio signal obtained in step 102 may be expressed as $X_u \in \mathbb{R}^{1 \times F \times N}$, where 1 represents that $X_u$ only has one channel, that is, the time-frequency map is a grayscale map; F is a height of the time-frequency map, that is, the time-frequency map represents a quantity of frequency components of the STFT; and N is a width of the time-frequency map, that is, a quantity of sliding windows of the STFT in time domain.

The motor trajectory information obtained in step 102 may be expressed as $X_v \in \mathbb{R}^{2 \times K \times M}$, where 2 means that $X_v$ has two channels, which are values of a coordinate of a key point on two coordinate axes; K is a quantity of target part key points on each image frame; and M is a quantity of image frames in the video data.

Last dimensions of two tensors $X_u \in \mathbb{R}^{1 \times F \times N}$ and $X_v \in \mathbb{R}^{2 \times K \times M}$ from audio and video modes separately represent a quantity N of audio frames (the quantity of sliding windows of the STFT) and a quantity M of video frames M. Sampling rates and processing manners of the two modes are inconsistent, and N and M are usually inconsistent. Furthermore, time lengths represented by an audio frame and a video frame are also often inconsistent. Therefore, in order to effectively fuse information of the two modes, a cross-mode information fusion manner of this scheme can be used to effectively fuse information from different modes. For example, the features of the time-frequency information and the motor trajectory information can be extracted first, and the subsequent steps are then performed.

For example, a feature extraction network (which can be composed of two convolutional neural networks, for example) of a trained detection model can be specifically used to process the two tensors into the audio feature (ultrasound embedding) $E_u \in \mathbb{R}^{D \times N}$ and the motion feature (lip motion embedding) $E_v \in \mathbb{R}^{D \times M}$. The audio feature may include an audio frame feature corresponding to at least one audio frame, and the motion feature may include an image frame feature corresponding to at least one image frame.

In order to improve the efficiency of liveness detection, a detection model may be pre-trained to obtain the trained detection model, and the feature extraction network of the trained detection model is then used to extract the features of the time-frequency information and the motor trajectory information. In this embodiment, the detection model may be trained from a plurality of training samples. Specifically, the detection model may be provided for the liveness detection apparatus after being trained by other devices, or may be trained by the liveness detection apparatus on its own. That is, before the trained detection model is used, the liveness detection method can further include:

obtaining a plurality of training samples;
  predicting the training samples by using the detection model to obtain a predicted detection result; and
  calculating a loss between the predicted detection result and an actual sample result, and converging the detection model based on the loss to obtain the trained detection model.

In this embodiment, the trained detection model may be composed of a transformer-based bidirectional encoder representations from transformers (BERT) model. For example, the trained detection model may include a feature extraction network, two transformer encoders, one transformer decoder, a detection network, a verification network, and the like. Both the detection network and the verification network may be multi-layer perceptrons composed of fully connected layers.

104. Calculate first global attention information of the to-be-detected object according to the audio feature, and calculate second global attention information of the to-be-detected object according to the motion feature.

The first global attention information is feature information concerned with a global correlation of the audio feature, and the second global attention information is feature information concerned with a global correlation of the motion feature.

For example, the processed audio signal includes at least one audio frame signal; the audio feature includes at least one audio frame feature; the video data includes at least one image frame; and the motion feature includes at least one image frame feature. It may specifically include: interpolating a first global feature to the audio feature, and taking the first global feature as an audio frame feature of the processed audio signal; calculating attention information of each audio frame feature in the audio feature to the first global feature by using a first transformer encoder of a trained detection model, to obtain the first global attention information; interpolating a second global feature to the motion feature, and taking the second global feature as an image frame feature of the video data; and calculating attention information of each image frame feature in the motion feature to the second global feature by using a second transformer encoder of the trained detection model, to obtain the second global attention information.

In this embodiment, the step of "calculating attention information of each audio frame feature in the audio feature to the first global feature by using a first transformer encoder of a trained detection model, to obtain the first global attention information" may specifically include: generating, according to the audio feature, a first query vector, a first key vector and a first value vector corresponding to each audio frame feature; performing point-by-point integration on the first query vector of each audio frame feature and a first key vector of the first global feature to obtain a self-attention vector set of the first global feature; and multiplying the self-attention vector set of the first global feature with a first value vector corresponding to the first global feature, and performing weighted summation on results obtained by the multiplication to obtain the first global attention information.

For example, a first transformer encoder of the trained detection model includes at least one first attention module, at least one first feedforward neural network and at least one first residual module. For example, the audio feature is input to a plurality of first representation subspaces separately, and the first attention modules are used to extract the audio frame feature of each audio frame in the various first representation subspaces. In one first representation subspace, a following example is taken for description: The first attention module extracts the audio frame feature of each audio frame. The first attention module performs dimension reduction on the audio frame feature of each audio frame, and generates a query vector (Q for short), a key vector (K for short) and a value vector (V for short) from the audio frame feature subjected to dimension reduction. A self-attention vector of a target audio frame is calculated by processing the remaining audio frames in the processed audio signal, to obtain initial context information of the target audio frame.

The calculation of the context information output through a self-attention mechanism of the target audio frame may be as follows:

$$A(q_i, K, V) = V \frac{K^T q_i / \sqrt{d}}{\sum_{t=1}^{T} \exp(k_t^T q_i / \sqrt{d})}$$

where $q_i$ is the query vector of the target audio frame; $K^T$ is the key vector of the target audio frame; V is the value vector of the target audio frame; and d is a dimension of the key vector of the target audio frame.

According to the above calculation formula, it can be seen that the self-attention vector of the target audio frame, namely, the initial context information, can be obtained by calculating the three vectors of the target audio frame. For example, point-by-point integration can be performed on the key vectors of the remaining audio frames and the query vector of the target audio frame to obtain the self-attention vector set of the target audio frame. Dimension reduction is performed on the values in the self-attention vector set of each audio frame in the processed audio signal. A dimension reduction manner may be dividing a square root of the key vector of the target audio frame. The self-attention vectors in the self-attention vector set of the target audio frame are multiplied with the value vector corresponding to the target audio frame, and the weighted summation is performed on results obtained by the multiplication, to obtain a self-attention vector output of the selected target audio frame in the processed audio signal and obtain the initial context information of the target audio frame. The above steps are repeated to obtain self-attention vector outputs of the remaining audio frames in the processed audio signal, and finally the initial context information of each audio frame of the processed audio signal in the different first representation subspaces.

The initial context information of each audio frame of the processed audio signal in each first representation subspace is weighted. For example, the initial context information of each audio frame in different first representation subspaces is spliced, and the spliced initial context information of each audio frame is weighted to obtain fused initial context information of each audio frame in all the first representation subspaces. Next, the obtained fused initial context information of each audio frame is input to the first residual module through the first feedforward neural network for feature extraction. For example, the fused initial context information of each audio frame is input to the first residual module through the first feedforward neural network for summation and normalization to obtain the self-attention information of each audio frame. The self-attention information of each audio frame includes the first global attention information corresponding to the first global feature and the first attention feature information corresponding to each audio frame feature.

In this embodiment, the first transformer encoder of the trained detection model may include a plurality of transformer encoder layers, and each transformer encoder layer may include a first attention module, a first feedforward neural network and a first residual module. In the process of analyzing the audio frame feature information of each audio frame in the processed audio signal to obtain the self-attention information of each audio frame, the plurality of transformer encoder layers can be connected in series for processing. A quantity of the transformer encoder layers is set according to actual application requirements.

In this embodiment, the step of "calculating attention information of each image frame feature in the motion feature to the second global feature by using a second transformer encoder of the trained detection model, to obtain the second global attention information" may specifically include: generating, according to the motion feature, a second query vector, a second key vector and a second value vector that correspond to each image frame feature; performing point-by-point integration on the second query vector of each image frame feature and a second key vector of the second global feature to obtain a self-attention vector set of the second global feature; and multiplying the self-attention vector set of the second global feature with a second value vector corresponding to the second global feature, and performing weighted summation on results obtained by the multiplication, to obtain the second global attention information.

For example, a second transformer encoder of the trained detection model includes at least one second attention module, at least one second feedforward neural network and at least one second residual module. For example, the audio feature is input to a plurality of second representation subspaces separately, and the second attention modules are used to extract the image frame feature of each image frame in the various second representation subspaces. In one second representation subspace, a following example is taken for description: The second attention module extracts the image frame feature of each image frame. The second attention module performs dimension reduction on the image frame feature of each image frame, and generates a query vector, a key vector and a value vector from the image frame feature subjected to dimension reduction. A self-attention vector of a target image frame is calculated through the remaining images frames in the video data to obtain initial context information of the target image frame.

The calculation of the context information output through a self-attention mechanism of the target image frame may be as follows:

$$A(q_i, K, V) = V \frac{K^T q_i / \sqrt{d}}{\sum_{t=1}^{T} \exp(k_t^T q_i / \sqrt{d})}$$

where $q_i$ is the query vector of the target image frame; $K^T$ is the key vector of the target image frame; V is the value vector of the target image frame; and d is a dimension of the key vector of the target image frame.

According to the above calculation formula, it can be seen that the self-attention vector of the target image frame, namely, the initial context information, can be obtained by calculating the three vectors of the target image frame. For example, a point-by-point integration can be performed on the key vectors of the remaining image frames and the query vector of the target image frame to obtain the self-attention vector set of the target image frame. Dimension reduction is performed on the values in the self-attention vector set of each image frame in the video data. A dimension reduction manner may be dividing a square root of the key vector of the target image frame. The self-attention vector in the self-attention vector set of the target image frame is multiplied with the value vector corresponding to the target image frame, and the weighted summation is performed on the result obtained by the multiplication, to obtain a self-attention vector output of the selected target image frame in the video data and obtain the initial context information of the target image frame. The above steps are repeated to obtain self-attention vector outputs of the remaining image frames in the video data, and finally the initial context information of each image frame of the video data in the different second representation subspaces.

The initial context information of each image frame of the video data in each second representation subspace is weighted. For example, the initial context information of each image frame in different second representation subspaces is spliced, and the spliced initial context information of each image frame is weighted to obtain fused initial context information of each image frame in all the second representation subspaces. Next, the obtained fused initial context information of each image frame is input to the second residual module through the second feedforward neural network for feature extraction. For example, the fused initial context information of each image frame is input to the second residual module through the second feedforward neural network for summation and normalization to obtain the self-attention information of each image frame. The self-attention information of each image frame includes the second global attention information corresponding to the second global feature and the second attention feature information corresponding to each image frame feature.

In this embodiment, the second transformer encoder of the trained detection model may include a plurality of transformer encoder layers, and each transformer encoder layer may include a second attention module, a second feedforward neural network and a second residual module. In the process of analyzing the image frame feature information of each image frame in the video data to obtain the context information of each image frame, the plurality of transformer encoder layers can be connected in series for processing. A quantity of the transformer encoder layers is set according to actual application requirements.

105. Fuse the first global attention information with the second global attention information to obtain fused global information, and determine a liveness detection result of the to-be-detected object based on the fused global information.

For example, it may specifically include: fusing the first global attention information with the second global attention information to obtain fused global information; and performing liveness detection on the to-be-detected object based on the fused global information, and obtaining a liveness detection result of the to-be-detected object.

For example, the first global attention information with the second global attention information are spliced to obtain the fused global information; and binary classification is performed on the fused global information by using the detection network of the trained detection module, and the liveness detection result of the to-be-detected object is determined according to a classification result. For example, the detection network of the trained detection model may specifically be a multi-layer perception (MLP) composed of fully connected (FC) layers, to perform binary-classification liveness detection judgment, such as live or spoof In order to further improve the accuracy of liveness detection, a consistency between the reflected audio signal and the video data can be judged, so as to determine whether cross-mode features are consistent. For example, after the step of "determining a liveness detection result of the to-be-detected object based on the fused global information", the method may further include:

calculating first attention feature information of the to-be-detected object according to the audio feature, and calculating second attention feature information of the to-be-detected object according to the motion feature, the first attention feature information being feature information concerned with a correlation of the audio feature, and the second global attention information being feature information concerned with a correlation of the motion feature; and performing consistency verification on the reflected audio signal and the video data of the to-be-detected object based on the first attention feature information and the second attention feature information, and determining, according to a verification result, whether the liveness detection result is correct.

In this embodiment, the step of "calculating first global attention information of the to-be-detected object according to the audio feature, and calculating second global attention information of the to-be-detected object according to the motion feature" may specifically include:

calculating attention information of a correlation between each audio frame feature in the audio feature by using a first transformer encoder of a trained detection model, to obtain the first attention feature information; and calculating attention information of a correlation between each image frame feature in the motion feature by using a second transformer encoder of the trained detection model, to obtain the second attention feature information. The specific process of calculating the first attention feature information and the second attention feature information of the to-be-detected object can be seen in step 104.

In this embodiment, the step of "performing consistency verification on the reflected audio signal and the video data of the to-be-detected object based on the first attention feature information and the second attention feature information, and determining, according to a verification result, whether the liveness detection result is correct" may specifically include:

calculating mutual attention information between the first attention feature information and the second attention feature information by using a transformer decoder of the trained detection model; and performing consistency verification on the mutual attention information by using a verification network of the trained detection model, and determining, when a verification result succeeds, that the liveness detection result is correct.

For example, after the first attention feature information of the audio frame feature and the second attention feature information of the image frame feature are obtained, the transformer decoder of a trained detection model can be used to calculate the mutual attention information between the first attention feature information and the second attention feature information. The transformer decoder of the trained language model may include at least one attention module, at least one third feedforward neural network and at least one third residual module. For example, the details can be as follows:

The first attention feature information and the second attention feature information (including a plurality of pieces of attention feature information) are input to the transformer decoder. The query vector is extracted from the first attention feature information, and the key vector and value vector are extracted from the second attention feature information. Decoding is performed by calculating the mutual attention information of the first attention feature information and the second attention feature information. For example, the self-attention vector set of the first attention feature information can be obtained by performing point-by-point integration on the key vector of the second attention feature information and the query vector of the first attention feature information, and dimension reduction is performed on the values in the self-attention vector set of the first attention feature information. A dimension reduction manner may be dividing a square root of the key vector of the second attention feature information. The self-attention vector in the self-attention vector set of the first attention feature information is multiplied with the value vector corresponding to the second attention feature information, and weighted summation is performed on the result obtained by the multiplication, to obtain a self-attention vector output of a selected target word in text description information. The above steps are repeated to obtain an initial mutual attention feature of each piece of attention feature information. The initial mutual attention feature of each piece of attention feature information is then weighted to obtain a fused initial mutual attention feature. The fused initial mutual attention feature is input to the third residual module through the third feedforward neural network for feature extraction. For example, the fused initial mutual attention feature is input to the third residual module for summation and normalization to obtain a mutual attention feature. Finally, the mutual attention information is obtained after performing linear transformation on the mutual attention feature.

In this embodiment, in the process of calculating the mutual attention information between the first attention feature information and the second attention feature information, a plurality of transformer decoders can be connected in series for calculation. For example, a first layer of mutual attention feature is obtained through a first transformer decoder, and a second transformer decoder repeats the step of the first transformer decoder for the first layer of mutual attention feature to obtain a second layer of mutual attention feature, and so on. The final output mutual attention feature is obtained through the multiple layers of transformer decoders. A quantity of the transformer decoders is set according to actual application requirements.

In this embodiment, in order to further improve the accuracy of liveness detection, in the process of the liveness detection, in addition to requiring a user to complete one or more actions such as opening the mouth, shaking the head, nodding or other gestures prompted by the liveness detection apparatus, the user may also be required to complete a language action (such as reading numbers, reading Chinese characters, or speaking idioms) prompted by the liveness detection apparatus at random. For example, when the liveness detection apparatus requires the user to complete a language action (such as reading numbers), it can be determined whether the user is live according to whether a lip motion of the language action that is completed by the user is consistent with the reflected audio signal. A voice generated when the user completes the language action is further recognized, and whether the user has accurately completed the language action prompted by the liveness detection apparatus is determined according to a recognition result (for example, recognizing a voice of the user when the user reads numbers, and determining, according to a recognition result, whether the user has accurately read out the numbers prompted by the liveness detection apparatus), so as to further improve the accuracy of liveness detection. There are many ways for voice recognition, which will not be described here one by one.

In this embodiment, after it is determined that the to-be-detected object is live, face recognition can be performed on the to-be-detected object to determine identity information of the to-be-detected object, thereby improving the accuracy and security of face recognition, and then applying the face recognition to various kinds of payment scenarios, identity verification scenarios, or the like.

In order to improve the security of liveness detection, the data in the above method is stored in a blockchain. The blockchain is a new application mode of computer technologies such as distributed data storage, point-to-point transmission, a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include a blockchain underlying platform, a platform product service layer, and an application service layer.

The blockchain underlying platform may include processing modules such as a user management module, a basic service module, an intelligent contract module, and an operation supervision module. The user management module is responsible for identity information management of all blockchain participants, including maintaining public-private key generation (account management), key management, maintaining a correspondence between the real identity of a user and a blockchain address (permission management), and the like, supervising and auditing transaction conditions of some real identities with authorization, and providing rule configuration of risk control (risk control auditing). The basic service module is deployed on all blockchain node devices and configured to verify the validity of a service request, and after a consensus is reached on a valid request, record the valid request in storage. For a new service request, the basic service module first parses interface adaptation and performs authentication processing (interface adaptation), then encrypts service information by using a consensus algorithm (consensus management), transmits the complete and consistent service information after encryption to a shared ledger (network communication), and performs recording and storing. The intelligent contract module is responsible for contract registration and publication, contract triggering, and contract execution. A developer may define contract logic by using a programming language, and release the contract logic onto a blockchain (contract registration). According to the logic of contract items, a key or another event is invoked to trigger execution, to complete the contract logic. The function of upgrading or canceling a contract is further provided. The operation supervision module is mainly responsible for deployment, configuration modification, contract setting, and cloud adaptation during product releasing and visualized output of a real-time status during product operation, for example, alarming, monitoring network conditions, and monitoring a health status of a node device.

The platform product service layer provides basic capabilities and an implementation framework of a typical application. Based on these basic capabilities, developers may superpose characteristics of services and complete blockchain implementation of service logic. The application service layer provides a blockchain solution-based application service for use by a service participant.

It can be seen from the above that this embodiment can perform the signal processing and the time-frequency analysis on the reflected audio signal to obtain the time-frequency information, extract the motion trajectory information from the video data, and perform cross-modal fusion on the time-frequency information with the motion trajectory information, thereby effectively improving accuracy of liveness detection. In addition, the embodiments of the present disclosure can perform consistency judgment on the reflected audio signal and the video data after the liveness detection, which further improves the accuracy of the liveness detection.

According to the method described in the foregoing embodiments, the following further provides detailed descriptions of the liveness detection method.

In this embodiment, an example is used for description: The liveness detection apparatus is integrated in an electronic device. The electronic device is a server. The to-be-detected object is a to-be-detected user. The target region is the face. The target part is the lip. The audio signal is an ultrasonic signal.

(I) First, a preset detection model can be trained, which may be specifically as follows:

In order to improve the efficiency of liveness detection, a detection model may be pre-trained to obtain the trained detection model, and the feature extraction network of the trained detection model is then used to extract the features of the time-frequency information and the motor trajectory information. In this embodiment, the detection model may be trained from a plurality of training samples. Specifically, the detection model may be provided for the liveness detection apparatus after being trained by other devices, or may be trained by the liveness detection apparatus on its own. That is, before the trained detection model is used, the liveness detection method can further include:

obtaining a plurality of training samples; predicting the training samples by using the detection model to obtain a predicted detection result; and calculating a loss between the predicted detection result and an actual sample result, and converging the detection model based on the loss to obtain the trained detection model.

Figure 2A:
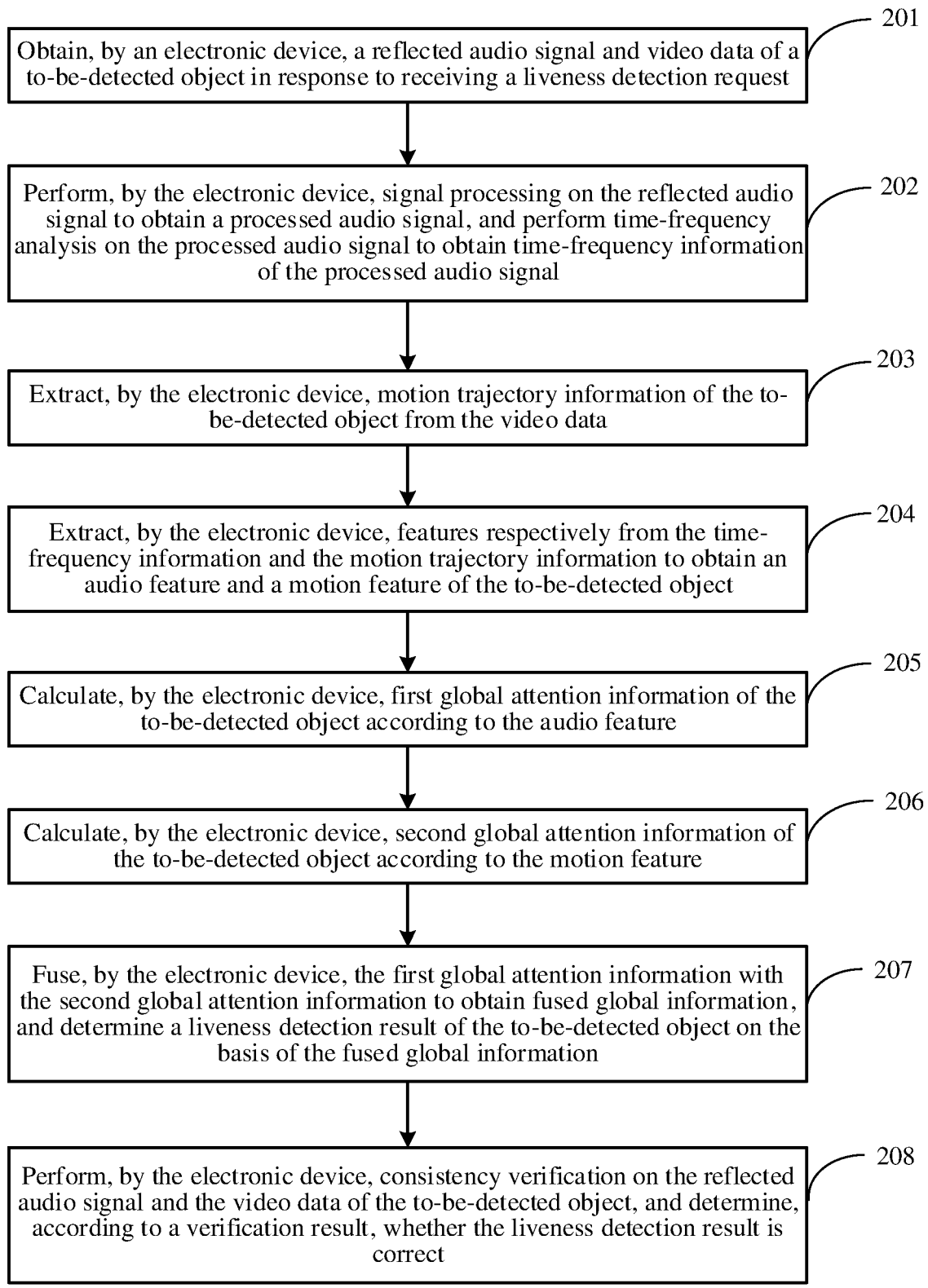
FIG. 2*a* is a second flowchart of a liveness detection method provided by an embodiment of the present disclosure.
Figure 2B:
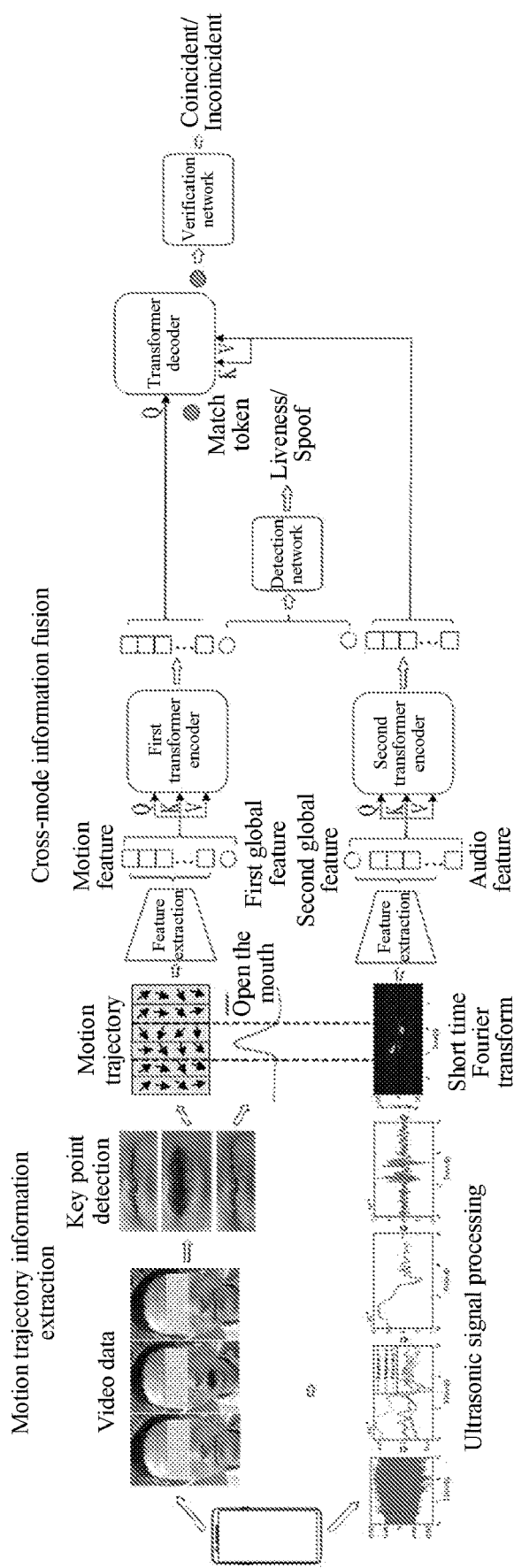
FIG. 2*b* is a third flowchart of a liveness detection method provided by an embodiment of the present disclosure.

(II) The liveness detection can be performed on the to-be-detected object by using the trained detection model, which may be specifically seen in FIG. 2a and FIG. 2b.

As shown in FIG. 2a, a liveness detection method may specifically include following steps 201-208:

201. Obtain, by an electronic device, a reflected audio signal and video data of a to-be-detected object in a case of receiving a liveness detection request.

For example, a terminal may transmit an initial audio signal to the to-be-detected object, and the terminal may receive the reflected audio signal reflected by the to-be-detected object. Meanwhile, the terminal acquires the video data of the to-be-detected object. The terminal sends the received reflected audio signal and the acquired video data to a server. For example, the terminal may be specifically a mobile phone.

For example, an audio output device (for example, an earpiece of the mobile phone) of the terminal can transmit the initial audio signal to the to-be-detected object, and an audio input device (for example, a microphone of the mobile phone) of the terminal can receive the reflected audio signal reflected by the to-be-detected object. At the same time, an image acquisition device (for example, a camera of the mobile phone) of the terminal can acquire the video data of the to-be-detected object. The reflected audio signal received by the audio input device of the terminal and the video data acquired by the image acquisition device are sent to the electronic device, so that the liveness detection apparatus of the electronic device can perform liveness detection on the to-be-detected object based on the reflected audio signal and the video data. For example, the earpiece can be used to play the ultrasonic signal, and the microphone can be used to record the ultrasonic signal. Once the speaker starts to play the ultrasonic signal, the microphone starts to record the ultrasonic signal. The recorded signal contains the reflected ultrasonic signal. A recorded audio signal is uploaded to the server for subsequent processing.

For example, when the mobile phone performs the liveness detection, the speaker of the mobile phone can be used to play an imperceptible ultrasonic signal, and the microphone can be used to record an echo signal caused by a user completing a specified action. Then, the echo signal recorded by the microphone is uploaded to the server. Since this scheme can use the earpiece, the speaker, the microphone of the mobile phone to obtain the reflected audio signal and the video data required for the liveness detection, without additional hardware devices, this scheme can be implemented on an ordinary mobile terminal without relying on special hardware, which greatly saves hardware resources and improves the convenience, implementability and operability of the liveness detection.

Because of the directionality of propagation of ultrasonic waves, when the terminal is a mobile phone, the earpiece at the top of the mobile phone can be selected to play the ultrasonic signal, and an effect of an algorithm is better than that of the speaker at the bottom of the mobile phone.

Before being transmitted to the to-be-detected object, the initial audio signal can be generated first. In order to improve the accuracy of liveness detection, a generated audio can be obtained by superimposing a plurality of tones. In addition, in order to avoid an audio playback attack, a carrier frequency of the generated audio can be randomized, so that an attacker cannot bypass the current detection by replaying previously recorded audios. For example, it may include: superimposing target audio signals of a plurality of tones to obtain a superimposed audio signal; and randomizing a carrier frequency of the superimposed audio signal, and generating the initial audio signal.

For example, the target audio signals of the plurality of tones may be superimposed in the following manner: $\Sigma_{k=1}^{N} 2A \cos 2\pi f_k t$, where 2A is an amplitude; $f_k$ is the carrier frequency of the signal; and N is a total quantity of sub-carriers.

For selection of the carrier frequency $f_k$, the following two points are mainly considered: First, frequency responses of different terminals (such as mobile phones) are different. Therefore, a frequency with a poor frequency response needs to be selected because a distance between the face and the mobile phone is relatively short, and a frequency with a good frequency response may cause interference at a distance. Secondly, in order to avoid interference between adjacent frequency signals, a frequency interval $\Delta f$ between any two tones can be specified to be at least 300 Hz. In addition, the carrier frequency of the generated audio can be randomized to resist an audio replay attack, so that an attacker cannot bypass the detection of the scheme by replaying a previously recorded audio. Considering that most people cannot hear sounds with a frequency greater than 18 KHz, and audio hardware of the mobile phone is not sensitive to a frequency response of sounds with a frequency greater than 21 KHz, the frequency of the ultrasonic signal can be set in a range of 18 KHz-21 KHz.

202. Perform, by the electronic device, signal processing on the reflected audio signal to obtain a processed audio signal, and perform time-frequency analysis on the processed audio signal to obtain time-frequency information of the processed audio signal.

The processed audio signal may include at least one audio frame signal.

The quality of signal obtaining is crucial to the accuracy of liveness detection. In an actual environment, an interference and a noise introduced in ultrasonic signal propagation will weaken the audio signal reflected by a human body and affect the accuracy of liveness detection. Therefore, in order to enhance the reflected audio signal from the face, space-domain enhancement processing can be performed on the reflected audio signal, so that the signal can be enhanced according to a position of the face, to suppress the interference and the noise and achieve more accurate liveness detection. For example, the electronic device may perform space-domain enhancement processing on the reflected audio signal to obtain a space-domain enhancement signal; and perform signal extraction processing on the space-domain enhancement signal to obtain the processed audio signal, and perform the time-frequency analysis on the processed audio signal to obtain the time-frequency information of the processed audio signal.

For example, the electronic device may specifically perform quadrature demodulation on the reflected audio signal to obtain an analytic signal; and perform the space-domain enhancement processing on the analytic signal by using a preset space-domain matrix to obtain the space-domain enhancement signal.

For example, the quadrature demodulation is performed on the received reflected audio signal to obtain a complex signal x on different carriers, namely, the analytic signalx. A specific process may be as follows.

In the face detection process, an action of the user plays a role in modulating the ultrasonic signal. The reflected audio signal is composed of multiple paths, including a reflection path from the face, a solid propagation path, an air propagation path, and reflection paths of surrounding objects. Assuming that there are M paths, an expression of the reflected audio signal Rec(t) recorded by the microphone can be as follows:

$$Rec(t) = \sum_{i=1}^{M}\sum_{k=1}^{N} 2A_i(t)\cos\left(2\pi f_k t - 2\pi f \frac{d_i(t)}{\mu_i} - \varphi_i\right)$$

where i represents an ith path; $2A_i(t)$ represents an amplitude of a sound signal in the ith path; $2\pi f d_i(t)/\mu_i$ represents a phase shift caused by a propagation delay; and $\varphi_i$ represents a phase shift caused by a system delay.

The initial audio signal played by the speaker is regarded as a carrier signal, and the reflected audio signal Rec(t) recorded by the microphone is regarded as a superposition of a plurality of baseband signals subjected to phase shift modulation. Since the generated ultrasonic audio is a superposition of multiple audio signals with different frequencies, the initial audio signal played by the speaker can be regarded as a superposition of the baseband signals with different frequencies. Since the recorded signal is synchronized with the played signal, the recorded sound signal can be demodulated using coherent detection, and an I (in-phase) component and a Q (quadrature) component of the baseband signal on the carrier frequency $f_k$ by the following formula:

$$I(t) = \sum_{i=1}^{M}\sum_{k=1}^{N}(F_{down}(F_{low}(Rec(t) \times \cos 2\pi f_k t)))$$

$$Q(t) = \sum_{i=1}^{M}\sum_{k=1}^{N}(F_{down}(F_{low}(Rec(t) \times (-\sin 2\pi f_k t))))$$

where $F_{low}$ is a low-pass filter, and $F_{down}$ is a down-sampling function.

The formula $\cos(a) \times \cos(b) = \cos(a+b)/2 + \cos(a-b)/2$ is used to obtain $$R_k(t) \times \cos 2\pi f_k t =$$

$$\sum_{i=1}^{M} A_i(t)\left\{\left(\cos 2\pi f \frac{d_i(t)}{\mu_i} + \varphi_i\right) + \cos\left(4\pi f_k t - 2\pi f \frac{d_i(t)}{\mu_i} + \varphi_i\right)\right\}$$

Then, high-frequency terms of $F_{low}$ are removed by the low-pass filter $R_k(t) \times \cos 2\pi f_k t$, and downsampling is then performed through $F_{down}$. The I component of the baseband signal is calculated as follows:

$$I(t) = \sum_{i=1}^{M}\sum_{k=1}^{N} A_i(t)\cos\left(2\pi f \frac{d_i(t)}{\mu_i} + \varphi_i\right)$$

Similarly, the Q component can also be calculated as follows:

$$Q(t) = -\sum_{i=1}^{M}\sum_{k=1}^{N} A_i(t)\sin\left(2\pi f \frac{d_i(t)}{\mu_i} + \varphi_i\right)$$

Then, for the obtained baseband signals I(t) and Q(t), in order to improve the accuracy of recognition, interference signals of other paths need to be removed, and only signals related to a lip motion are retained. Dynamic interference signals refer to audio signals reflected by other moving objects nearby. Since motions of the body of a user usually cause signal frequency shift in a range of 50 Hz-200 Hz, and a maximum frequency shift caused by the lip motion usually does not exceed 40 Hz, setting a cut-off frequency of the low-pass filter $F_{low}$ for coherent detection to 40 Hz can eliminate the dynamic interference while demodulating the baseband signal.

$$I(t) = I_s(t) + \sum_{k=1}^{N} A_{lip}(t)\cos\left(2\pi f \frac{d_{lip}(t)}{v} + \theta_{lip}\right)$$

$$Q(t) = Q_s(t) - \sum_{k=1}^{N} A_{lip}(t)\sin\left(2\pi f \frac{d_{lip}(t)}{v} + \theta_{lip}\right)$$

$A_{lip}(t)$ is an amplitude of the reflected audio signal from the lip; $d_{lip}$ is the propagation delay; v is a propagation speed of sounds in air; and $\theta_{lip}$ is a phase shift caused by the system delay.

Then, the propagation time of the reflected audio signal from the lip in a medium is obtained through the space-domain enhancement processing; and only signals within this propagation time are extracted for high-pass filtering to remove static interference, and then subjected to zero-notch filtering and STFT. For example, the space-domain signal enhancement processing method can be used to transform an original signal to range domain.

After the above steps, an obtained complex signal is recorded as x, which may be specifically expressed below:

$x = I(t) + Q(t)$

An expression of the space-domain signal enhancement process may be as follows:

$y = Ax$ where y is the output space-domain enhancement signal, and A is a guide matrix (namely, the preset space-domain matrix) of the space-domain enhancement signal. The expression can be as follows:

$A = [a(\tau_1), a(\tau_2), \ldots, a(\tau_S)]$ $a(\tau) = e^{j2\pi f \tau}$ where $\tau$ is a propagation period of an ultrasonic wave in a medium from transmission to receiving; f is a signal frequency; j is an imaginary unit; and S is a preset possible propagation time of the signal. After the processing by the above formula, each point of the output spatial signal y represents a signal from different spatial positions.

For example, the electronic device may differentiate the space-domain enhancement signal based on a time axis of the space-domain enhancement signal to obtain a differentiated audio signal; determine propagation time of the to-be-detected object in a medium based on amplitude of the differentiated audio signal; extract a target audio signal from the space-domain enhancement signal according to the propagation time, and perform high-pass filtering on the target audio signal to obtain the processed audio signal; and perform short time Fourier transform on the processed audio signal to obtain the time-frequency information of the processed audio signal.

For example, in order to eliminate interference in an environment, such as leakage of a signal that is directly from the earpiece to the microphone, y can be differentiated along the time axis. That is, $$y'_t = y_{t+1} - y_t$$

where t is a time stamp of the space-domain enhancement signal. Then, the propagation time of the reflected audio signal of the to-be-detected object in the medium is determined according to the amplitude of the space-domain enhancement signal $y'_t$, and high-pass filtering is performed on the signal extracted within the propagation time, to obtain the processed audio signal. The short time Fourier transform STFT is finally performed to obtain a time-frequency map of the processed audio signal, that is, the time-frequency information of the processed audio signal. The time-frequency map of the processed audio signal is a two-dimensional spectrum, which can represent a graph where the spectrum of the signal varies over time. A vertical axis is a frequency, and a horizontal axis is time.

In this embodiment, in order to further eliminate the interference and improve the accuracy of liveness detection, the time-frequency map of the processed audio signal can be cut by analyzing the video data of the action. The reason for cutting is that if the received signal is not cut, it is difficult to determine which part of the received signal is the action of the user and which part is another interference, for example, wiggling fingers, background people walking, and the like. For example, actions of opening and closing the mouth are taken as an example, a cutting process can be shown in FIG. 2b. Specifically, an action region of interest, such as the mouth, may be found through face detection and face key point detection algorithms. A timing curve is obtained by analyzing an extent of opening and closing the mouth, for example, a height-to-width ratio of mouth key points. When an amplitude of the curve rises and falls to set thresholds, the curve portion between the two thresholds is determined as an interval of the action between beginning and end. After audios and videos are synchronized, useful signal fragments corresponding to the action interval can be cut from the whole micro-Doppler feature map (namely, the time-frequency map), and information of other actions before and after opening the mouth is removed. For example, a micro-Doppler signal generated when the user performs the action is extracted by processing the reflected audio signal, and is converted into a time-frequency signal. Action detection is then performed on the recorded video to find a time interval during which the action occurs. The time-frequency signal is cut using this interval. For example, specifically, motion interval cutting may be performed on the time-frequency information of the processed audio signal to obtain time-frequency information after cutting. The extracting features respectively from the time-frequency information and the motion trajectory information to obtain an audio feature and a motion feature of the to-be-detected object may specifically include: extracting features respectively from the time-frequency information after cutting and the motion trajectory information to obtain the audio feature and the motion feature of the to-be-detected object.

203. Extract, by the electronic device, the motion trajectory information of the to-be-detected object from the video data.

Since liveness detection based only on an audio signal is less secure in the face of attacks specifically aimed at the audio signal, and it is at the same time considered that changes of an ultrasonic signal depends on a current action performed by the user. Therefore, the motion information in the video data can be extracted, so that the motion information in a visual mode can be used for combined judgment to improve the security and accuracy of liveness detection. For example, the video data includes at least one image frame. The electronic device may specifically perform key point detection on each image frame in the video data to obtain key point information corresponding to each image frame; differentiate two adjacent image frames to obtain a motion vector of the key point information between the two adjacent image frames; and determine the motion trajectory information of the to-be-detected object based on all the motion vectors of the video data.

For example, lip motion information of the lip in the face of a to-be-detected user is taken as an example. $\{V_0, V_1, \ldots, V_M\}$ is set as an acquired video sequence. Face detection and face key point positioning are performed on each image frame in the video sequence. K key point positions corresponding to the lip in each image frame are extracted, and a lip key point sequence $\{L_0, L_1, \ldots, L_M\}$ of all the image frames is obtained, where the lip key point sequence of an mth image frame is $L_m = \{P_1, P_2, \ldots, P_K\}$, and $P_k = (x_k, y_k)$ is a coordinate of a kth key point on this frame of image. The key point sequences of adjacent image frames are differentiated to obtain a motion vector, namely, $MV_m = L_{m+1} - L_m$, between the two frames. A resulting motion vector sequence reflects a motion trajectory $\{MV_0, MV_2, \ldots, MV_{M-1}\}$ of key points of the lip when the user opens and closes the mouth.

204. Extract, by the electronic device, features respectively from the time-frequency information and the motion trajectory information to obtain an audio feature and a motion feature of the to-be-detected object.

The time-frequency information (such as the time-frequency map) of the obtained processed audio signal may be expressed as $X_u \in \mathbb{R}^{1 \times F \times N}$, where 1 represents that $X_u$ only has one channel, that is, the time-frequency map is a grayscale map; F is a height of the time-frequency map, that is, the time-frequency map represents a quantity of frequency components of the STFT; and N is a width of the time-frequency map, that is, a quantity of sliding windows of the STFT in time domain.

The obtained motor trajectory information may be expressed as $X_v \in \mathbb{R}^{2 \times K \times M}$, where 2 means that $X_v$ has two channels, which are values of a coordinate of a key point on two coordinate axes; K is a quantity of target part key points on each image frame; and M is a quantity of image frames in the video data.

Last dimensions of two tensors $X_u \in \mathbb{R}^{1 \times F \times N}$ and $X_v \in \mathbb{R}^{2 \times K \times M}$ from audio and video modes separately represent a quantity N of audio frames (the quantity of sliding windows of the STFT) and a quantity M of video frames M. Sampling rates and processing manners of the two modes are inconsistent, and N and M are usually inconsistent. Furthermore, time lengths represented by an audio frame and a video frame are also often inconsistent. Therefore, in order to effectively fuse information of the two modes, a cross-mode information fusion manner of this scheme can be used to effectively fuse information from different modes.

For example, the electronic device may specifically use a feature extraction network (which can be composed of two convolutional neural networks, for example) of a trained detection model to process the two tensors into the audio feature $E_u \in \mathbb{R}^{D \times N}$ and the motion feature $E_v \in \mathbb{R}^{D \times M}$. The audio feature may include an audio frame feature corresponding to at least one audio frame, and the motion feature may include an image frame feature corresponding to at least one image frame.

205. Calculate, by the electronic device, first global attention information of the to-be-detected object according to the audio feature.

The first global attention information is feature information concerned with a global correlation of the audio feature. For example, the processed audio signal includes at least one audio frame signal, and the audio feature includes at least one audio frame feature. The electronic device may specifically interpolate a first global feature to the audio feature, and take the first global feature as an audio frame feature of the processed audio signal; and calculate attention information of each audio frame feature in the audio feature to the first global feature by using a first transformer encoder of a trained detection model, to obtain the first global attention information.

For example, the electronic device may specifically generate, according to the audio feature, a first query vector, a first key vector and a first value vector that correspond to each audio frame feature; perform point-by-point integration on the first query vector of each audio frame feature and a first key vector of the first global feature to obtain a self-attention vector set of the first global feature; and multiply the self-attention vector set of the first global feature with a first value vector corresponding to the first global feature, and perform weighted summation on results obtained by the multiplication, to obtain the first global attention information. For details of a specific process, refer to the foregoing example, and details are not described here again.

206. Calculate, by the electronic device, second global attention information of the to-be-detected object according to the motion feature.

The second global attention information is feature information concerned with a global correlation of the motion feature. For example, the video data includes at least one image frame; and the motion feature includes at least one image frame feature. The electronic device may specifically interpolate a first global feature to the audio feature, and take the first global feature as an audio frame feature of the processed audio signal; calculate attention information of each audio frame feature in the audio feature to the first global feature by using a first transformer encoder of a trained detection model, to obtain the first global attention information; interpolate a second global feature to the motion feature, and taking the second global feature as an image frame feature of the video data; and calculate attention information of each image frame feature in the motion feature to the second global feature by using a second transformer encoder of the trained detection model, to obtain the second global attention information.

For example, the electronic device may specifically generate, according to the motion feature, a second query vector, a second key vector and a second value vector that correspond to each image frame feature; perform point-by-point integration on the second query vector of each image frame feature and a second key vector of the second global feature to obtain a self-attention vector set of the second global feature; and multiply the self-attention vector set of the second global feature with a second value vector corresponding to the second global feature, and perform weighted summation on results obtained by the multiplication, to obtain the second global attention information.

207. Fuse, by the electronic device, the first global attention information with the second global attention information to obtain fused global information, and determine a liveness detection result of the to-be-detected object based on the fused global information.

For example, the electronic device may specifically fuse the first global attention information with the second global attention information to obtain fused global information; and perform liveness detection on the to-be-detected object based on the fused global information, and obtain a liveness detection result of the to-be-detected object. For example, the first global attention information with the second global attention information are spliced to obtain the fused global information; and binary classification is performed on the fused global information by using the detection network of the trained detection module, and the liveness detection result of the to-be-detected object is determined according to a classification result. For example, the detection network of the trained detection model may specifically be a perception composed of fully connected layers, to perform binary-classification liveness detection judgment, such as live or spoof.

For example, two transformer encoders (a first transformer encoder and a second transformer encoder) process two extracted features (the audio feature and the motion feature) separately. For example, a self-attention mechanism of a transformer can be used. Three inputs Q, K V of the first transformer encoder are all embedding+class tokens (audio feature+first global feature), and three inputs Q, K and V of the second transformer encoder are also embedding+class tokens (audio feature+second global feature). The global features are used to achieve information aggregation. The two class tokens (the first global attention information and the second global attention information) output by the transformer encoders will be spliced together, and then binary-classification liveness detection judgment (live/spoof) will be performed through a multi-layer perceptron (namely, a detection network) composed of fully connected layers.

208. Perform, by the electronic device, consistency verification on the reflected audio signal and the video data of the to-be-detected object, and determine, according to a verification result, whether the liveness detection result is correct.

In order to further improve the accuracy of liveness detection, a consistency between the reflected audio signal and the video data can be judged, so as to determine whether cross-mode features are consistent. For example, the electronic device may specifically: calculate first attention feature information of the to-be-detected object according to the audio feature, and calculate second attention feature information of the to-be-detected object according to the motion feature, the first attention feature information being feature information concerned with a correlation of the audio feature, and the second global attention information being feature information concerned with a correlation of the motion feature; and perform consistency verification on the reflected audio signal and the video data of the to-be-detected object based on the first attention feature information and the second attention feature information, and determine, according to a verification result, whether the liveness detection result is correct.

For example, the electronic device may specifically: calculate attention information of a correlation between each audio frame feature in the audio feature by using a first transformer encoder of a trained detection model, to obtain the first attention feature information; and calculate attention information of a correlation between each image frame feature in the motion feature by using a second transformer encoder of the trained detection model, to obtain the second attention feature information. Then the electronic device may: calculate mutual attention information between the first attention feature information and the second attention feature information by using a transformer decoder of the trained detection model; and perform consistency verification on the mutual attention information by using a verification network of the trained detection model, and determine, when a verification result succeeds, that the liveness detection result is correct.

For example, two embeddings output by the transformer encoders are input to one transformer decoder for consistency judgment. Consistency can refer to whether features such as an amplitude, a speed and time of a lip motion in a video mode are consistent with those in an audio mode. The mutual attention mechanism of the transformer decoder is used to record the audio feature as K and V and record the video feature as Q, as the inputs of the transformer decoder. At the same time, a match token can also be used to achieve information aggregation. Final consistency features will be aggregated on the match token, and then the binary-classification consistency judgment, for example, match or not match, will be performed through another multi-layer perceptron (namely, a verification network) composed of fully connected layers.

For details of a specific process, refer to the foregoing example, and details are not described here again.

For the scheme that only uses the audio mode for liveness detection, since acquisition of an ultrasonic signal is easily affected by interference and noise in a real environment, the signal quality will decrease. In addition, the security of the liveness detection based entirely on ultrasonic waves will be greatly reduced in the face of attacks specifically targeted at audio signals due to a limited amount of information. Therefore, this scheme combines the motion information in the visual mode to perform cross-mode verification, and can use a multi-task network of the detection model to complete a classification task and a cross-mode consistency judgment task of the liveness detection at the same time, which greatly improves the efficiency and accuracy of liveness detection.

The liveness detection can ensure that blinking, shaking the head, smiling and other combined actions are performed by a real face. The liveness detection can be applied in Internet finance, tax, social security, telecommunications, medical treatment and other industries in combination with face recognition and identity recognition technologies. For example, a payment scenario requires extremely high accuracy of face recognition, and the liveness detection is the key to ensure the security and the recognition accuracy. For example, in scenarios of bank securities, financial insurance, people's livelihood and social security, online education, auto finance, house rental, shared services, news media, blockchain, and the like, users need to carry out remote authentication to confirm their identity information. Through the liveness detection on the users, common attack means such as photos, face changing, masks, blocking and screen re-shooting can be effectively prevented, so as to effectively screen frauds and protect the interests of the users.

It can be seen from the above that this embodiment can enhance a reflected audio signal from a user by performing space-domain enhancement on the reflected audio signal, extract motion information of the user from video data, and then fuse an ultrasonic signal with the motion information across modes to achieve accurate liveness detection. After the liveness detection, this embodiment further performs consistency judgment on the reflected audio signal and the video data, which further improves the accuracy of liveness detection. This scheme can be deployed on widely used mobile devices without relying on special hardware, and can effectively defend attacks such as re-shooting and injection, and improve the security of a face detection technology. Compared with the scheme that only uses the audio mode for liveness detection, this scheme greatly improves the security and accuracy of liveness detection. Moreover, the scheme can enhance signals according to the position of the face, suppress interference and noise, and achieve more accurate liveness detection.

To better implement the foregoing method, correspondingly, an embodiment of the present disclosure further provides a liveness detection apparatus. The liveness detection apparatus may be integrated in an electronic device, and the electronic device may be a server, or may be a device such as a terminal.

Figure 3:
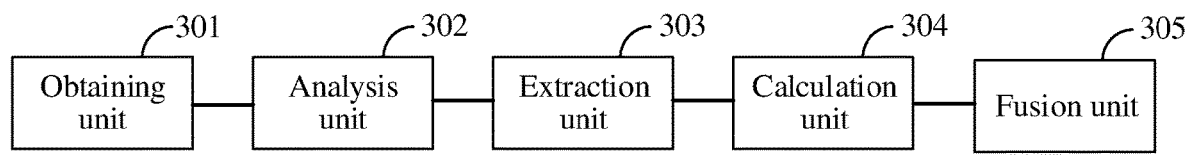
FIG. 3 is a schematic structural diagram of a liveness detection apparatus provided by an embodiment of the present disclosure.

For example, as shown in FIG. 3, the liveness detection apparatus may include an obtaining unit 301, an analysis unit 302, an extraction unit 303, a calculation unit 304 and a fusion unit 305, as follows:

The obtaining unit 301 is configured to obtain a reflected audio signal and video data of a to-be-detected object in response to receiving a liveness detection request.

The analysis unit 302 is configured to perform signal processing on the reflected audio signal to obtain a processed audio signal, perform time-frequency analysis on the processed audio signal to obtain time-frequency information of the processed audio signal, and extract motion trajectory information of the to-be-detected object from the video data.

The extraction unit 303 is configured to extract features from the time-frequency information and the motion trajectory information to obtain an audio feature and a motion feature of the to-be-detected object.

The calculation unit 304 is configured to calculate first global attention information of the to-be-detected object according to the audio feature, and calculate second global attention information of the to-be-detected object according to the motion feature, the first global attention information being feature information concerned with a global correlation of the audio feature, and the second global attention information being feature information concerned with a global correlation of the motion feature.

The fusion unit 305 is configured to fuse the first global attention information with the second global attention information to obtain fused global information, and determine a liveness detection result of the to-be-detected object based on the fused global information.

In some embodiments, the obtaining unit 301 may be specifically configured to: transmit an initial audio signal to the to-be-detected object; receive the reflected audio signal reflected by the to-be-detected object; and acquire the video data of the to-be-detected object.

In some embodiments, the liveness detection apparatus may further include a generation unit, as follows:

The generation unit may be specifically configured to: superimpose target audio signals of a plurality of tones to obtain a superimposed audio signal; and randomize a carrier frequency of the superimposed audio signal, and generate the initial audio signal.

In some embodiments, the analysis unit 302 may include an enhancement subunit and an analysis subunit, as follows:

The enhancement subunit is configured to perform space-domain enhancement processing on the reflected audio signal to obtain a space-domain enhancement signal.

The analysis subunit is configured to: perform signal extraction processing on the space-domain enhancement signal to obtain the processed audio signal, and perform the time-frequency analysis on the processed audio signal to obtain the time-frequency information of the processed audio signal.

In some embodiments, the enhancement subunit may be specifically configured to: perform quadrature demodulation on the reflected audio signal to obtain an analytic signal; and perform the space-domain enhancement processing on the analytic signal by using a preset space-domain matrix to obtain the space-domain enhancement signal.

In some embodiments, the analysis subunit may be specifically configured to: differentiate the space-domain enhancement signal based on a time axis of the space-domain enhancement signal to obtain a differentiated audio signal; determine propagation time of the to-be-detected object in a medium based on amplitude of the differentiated audio signal; extract a target audio signal from the space-domain enhancement signal according to the propagation time, and perform high-pass filtering on the target audio signal to obtain the processed audio signal; and perform short time Fourier transform on the processed audio signal to obtain the time-frequency information of the processed audio signal.

In some embodiments, the video data includes at least one image frame, and the analysis unit 302 may include a detection subunit and a determining subunit, as follows:

The detection subunit is configured to perform key point detection on each image frame in the video data to obtain key point information corresponding to each image frame.

The determining subunit is configured to determine the motion trajectory information of the to-be-detected object based on the key point information of each image frame.

In some embodiments, the determining subunit may be specifically configured to: differentiate two adjacent image frames to obtain a motion vector of the key point information between the two adjacent image frames; and determine the motion trajectory information of the to-be-detected object based on all the motion vectors of the video data.

In some embodiments, the processed audio signal includes at least one audio frame signal; the audio feature includes at least one audio frame feature; the video data includes at least one image frame; and the motion feature includes at least one image frame feature. The calculation unit 304 may include a first calculation subunit and a second calculation subunit, as follows:

The first calculation subunit is configured to: interpolate a first global feature to the audio feature, and take the first global feature as an audio frame feature of the processed audio signal; and calculate attention information of each audio frame feature in the audio feature to the first global feature by using a first transformer encoder of a trained detection model, to obtain the first global attention information.

The second calculation subunit is configured to: interpolate a second global feature to the motion feature, and take the second global feature as an image frame feature of the video data; and calculate attention information of each image frame feature in the motion feature to the second global feature by using a second transformer encoder of the trained detection model, to obtain the second global attention information.

In some embodiments, the first calculation subunit may be specifically configured to: generate, according to the audio feature, a first query vector, a first key vector and a first value vector that correspond to each audio frame feature; perform point-by-point integration on the first query vector of each audio frame feature and a first key vector of the first global feature to obtain a self-attention vector set of the first global feature; and multiply the self-attention vector set of the first global feature with a first value vector corresponding to the first global feature, and perform weighted summation on results obtained by the multiplication, to obtain the first global attention information.

In some embodiments, the second calculation subunit may be specifically configured to: generate, according to the motion feature, a second query vector, a second key vector and a second value vector that correspond to each image frame feature; perform point-by-point integration on the second query vector of each image frame feature and a second key vector of the second global feature to obtain a self-attention vector set of the second global feature; and multiply the self-attention vector set of the second global feature with a second value vector corresponding to the second global feature, and perform weighted summation on results obtained by the multiplication, to obtain the second global attention information.

In some embodiments, the liveness detection apparatus may further include a verification unit. The verification unit may include a first verification subunit and a second verification subunit, as follows:

The first verification subunit is configured to: calculate first attention feature information of the to-be-detected object according to the audio feature, and calculate second attention feature information of the to-be-detected object according to the motion feature, the first attention feature information being feature information concerned with a correlation of the audio feature, and the second global attention information being feature information concerned with a correlation of the motion feature.

The second verification subunit is configured to perform consistency verification on the reflected audio signal and the video data of the to-be-detected object based on the first attention feature information and the second attention feature information, and determine, according to a verification result, whether the liveness detection result is correct.

In some embodiments, the processed audio signal includes at least one audio frame signal; the audio feature includes at least one audio frame feature; the video data includes at least one image frame; and the motion feature includes at least one image frame feature. The first verification subunit may be specifically configured to: calculate attention information of a correlation between each audio frame feature in the audio feature by using a first transformer encoder of a trained detection model, to obtain the first attention feature information; and calculate attention information of a correlation between each image frame feature in the motion feature by using a second transformer encoder of the trained detection model, to obtain the second attention feature information.

In some embodiments, the second verification subunit may be specifically configured to: calculate mutual attention information between the first attention feature information and the second attention feature information by using a decoding network of the trained detection model; and perform consistency verification on the mutual attention information by using a verification network of the trained detection model, and determine, when a verification result succeeds, that the liveness detection result is correct.

During specific implementation, the foregoing units may be implemented as independent entities, or may be combined arbitrarily and implemented as the same entity or a plurality of entities. For specific implementation of the foregoing units, reference can be made to the foregoing method embodiments, so the details are not described herein again.

Figure 4:
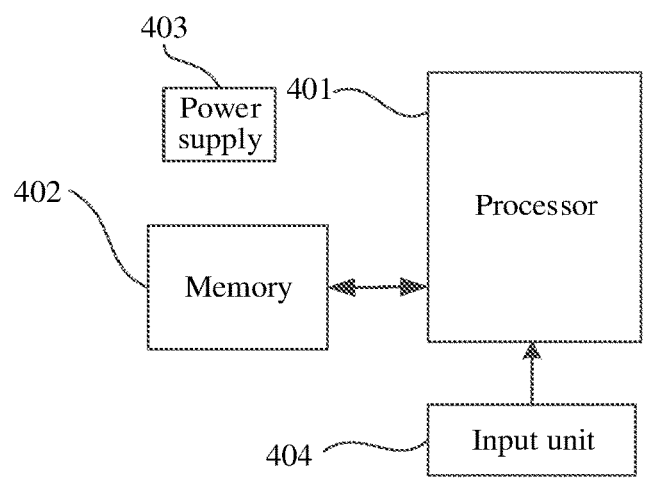
FIG. 4 is a schematic structural diagram of an electronic device provided by an embodiment of the present disclosure.

In addition, an embodiment of the present disclosure also provides an electronic device, as shown in FIG. 4, which shows a schematic structural diagram of the electronic device according to this embodiment of the present disclosure, specifically:

The electronic device may include components such as a processor 401 with one or more processing cores, a memory 402 with one or more computer-readable storage media, a power supply 403, and an input unit 404. A person skilled in the art may understand that the electronic device structure shown in FIG. 4 does not constitute a limit to the electronic device. The server may include more or fewer parts than those shown in the figure, may combine some parts, or may have different part arrangements.

Although not shown in the figure, the electronic device may further include a display unit, and the like. Details are not described herein again. Specifically, in this embodiment, the processor 401 of the electronic device may load, according to the following instructions, executable files corresponding to processes of one or more application programs into the memory 402. The processor 401 runs the application programs stored in the memory 402, to implement the various functions of the electronic device, for example, to implement any liveness detection method provided by the embodiments of the present disclosure.

Specific implementations of the above operations can be found in the previous embodiments and will not be described in detail herein.

A person of ordinary skill in the art could understand that, all or some steps of various methods in the embodiments may be implemented through instructions, or implemented through instructions controlling relevant hardware, and the instructions may be stored in a computer-readable storage medium and loaded and executed by a processor.

To this end, an embodiment of the present disclosure also provides a storage medium storing a plurality of instructions that can be loaded by a processor to perform the steps in any of the liveness detection methods provided by the embodiments of the present disclosure.

Specific implementations of the above operations can be found in the previous embodiments and will not be described in detail herein.

Since the instructions stored in the storage medium can perform the steps in any one of the liveness detection methods provided in the embodiments of the present disclosure, the advantageous effects that can be achieved by any one of the liveness detection methods provided in the embodiments of the present disclosure can be achieved, which are described in detail in the preceding embodiments and will not be described in detail herein.

According to one aspect of the present disclosure, a computer program product or a computer program is provided. The computer program product or the computer program includes computer instructions stored in a computer-readable memory. The processor of the computer device reads the computer instructions from the computer-readable storage medium, and executes the computer instructions, so that the computer device performs the steps in any liveness detection method in the embodiments of the present disclosure The liveness detection method and apparatus, the electronic device and the storage medium provided by the embodiments of the present disclosure have been described in detail above. Specific examples are used herein to illustrate the principles and implementations of the present disclosure. The description of the above embodiments is only used to help understand the method of the present disclosure and its core idea. At the same time, those skilled in the art will make changes to all specific implementations and application ranges according to the idea of the present disclosure. In conclusion, the content of this specification shall not be understood as a limitation to the present disclosure.

What is claimed is:

1. A liveness detection method, performed by an electronic device, the method comprising:
    obtaining a reflected audio signal and video data of an object to be detected in response to receiving a liveness detection request;
    performing signal processing on the reflected audio signal to obtain a processed audio signal, and performing time-frequency analysis on the processed audio signal to obtain time-frequency information of the processed audio signal;
    extracting motion trajectory information of the object from the video data;
    extracting features respectively from the time-frequency information and the motion trajectory information to obtain an audio feature and a motion feature of the object;
    calculating first global attention information of the object according to the audio feature, and calculating second global attention information of the object according to the motion feature, the first global attention information indicating a global correlation of the audio feature, and the second global attention information indicating a global correlation of the motion feature; and
    fusing the first global attention information with the second global attention information to obtain fused global information, and determining a liveness detection result of the object based on the fused global information.

2. The method according to claim 1, wherein the obtaining a reflected audio signal and video data of a object comprises:
    transmitting an initial audio signal to the object, and receiving the reflected audio signal reflected by the object; and
    acquiring the video data of the object.

3. The method according to claim 2, further comprising:
    superimposing target audio signals of a plurality of tones to obtain a superimposed audio signal; and
    randomizing a carrier frequency of the superimposed audio signal, to generate the initial audio signal.

4. The method according to claim 1, wherein the performing signal processing on the reflected audio signal to obtain a processed audio signal, and performing time-frequency analysis on the processed audio signal to obtain time-frequency information of the processed audio signal comprises:

performing space-domain enhancement processing on the reflected audio signal to obtain a space-domain enhancement signal; and performing signal extraction processing on the space-domain enhancement signal to obtain the processed audio signal, and performing the time-frequency analysis on the processed audio signal to obtain the time-frequency information of the processed audio signal.

5. The method according to claim 4, wherein the performing space-domain enhancement processing on the reflected audio signal to obtain a space-domain enhancement signal comprises:

performing quadrature demodulation on the reflected audio signal to obtain an analytic signal; and performing the space-domain enhancement processing on the analytic signal by using a preset space-domain matrix to obtain the space-domain enhancement signal.

6. The method according to claim 4, wherein the performing signal extraction processing on the space-domain enhancement signal to obtain the processed audio signal, and performing the time-frequency analysis on the processed audio signal to obtain the time-frequency information of the processed audio signal comprises:

differentiating the space-domain enhancement signal based on a time axis of the space-domain enhancement signal, to obtain a differentiated audio signal;

determining propagation time of the object in a medium based on amplitude of the differentiated audio signal;

extracting a target audio signal from the space-domain enhancement signal according to the propagation time, and performing high-pass filtering on the target audio signal to obtain the processed audio signal; and performing short time Fourier transform on the processed audio signal to obtain the time-frequency information of the processed audio signal.

7. The method according to claim 1, wherein the video data comprises at least one image frame; and the extracting motion trajectory information of the object from the video data comprises:

performing key point detection on the at least one image frame in the video data to obtain key point information corresponding to the at least one image frame; and determining the motion trajectory information of the object based on the key point information of the at least one image frame.

8. The method according to claim 1, wherein the processed audio signal comprises at least one audio frame signal; the audio feature comprises at least one audio frame feature; the video data comprises at least one image frame; the motion feature comprises at least one image frame feature; and the calculating first global attention information of the object according to the audio feature, and calculating second global attention information of the object according to the motion feature comprises:

interpolating a first global feature to the audio feature, and using the first global feature as an audio frame feature of the processed audio signal;

calculating attention information of the at least one audio frame feature in the audio feature to the first global feature by using a first transformer encoder of a trained detection model, to obtain the first global attention information;

interpolating a second global feature to the motion feature, and using the second global feature as an image frame feature of the video data; and calculating attention information of the at least one image frame feature in the motion feature to the second global feature by using a second transformer encoder of the trained detection model, to obtain the second global attention information.

9. The method according to claim 8, wherein the calculating attention information of the at least one audio frame feature in the audio feature to the first global feature by using a first transformer encoder of a trained detection model to obtain the first global attention information comprises: for an audio frame feature of the at least one audio frame feature:

generating, according to the audio feature, a first query vector, a first key vector and a first value vector corresponding to the audio frame feature;

performing point-by-point integration on the first query vector of the audio frame feature and a first key vector of the first global feature to obtain a self-attention vector set of the first global feature; and multiplying the self-attention vector set of the first global feature with a first value vector corresponding to the first global feature, and performing weighted summation on results obtained by the multiplication to obtain the first global attention information.

10. The method according to claim 1, further comprising:

calculating first attention feature information of the object according to the audio feature, and calculating second attention feature information of the object according to the motion feature, the first attention feature information indicating a correlation of the audio feature, and the second attention information indicating a correlation of the motion feature; and performing consistency verification on the reflected audio signal and the video data of the object based on the first attention feature information and the second attention feature information, to obtain a verification result; and determining, according to the verification result, whether the liveness detection result is correct.

11. The method according to claim 10, wherein the processed audio signal comprises at least one audio frame signal; the audio feature comprises at least one audio frame feature; the video data comprises at least one image frame; the motion feature comprises at least one image frame feature; and the calculating first attention feature information of the object according to the audio feature, and calculating second attention feature information of the object according to the motion feature comprises:

calculating attention information of a correlation between the at least one audio frame feature in the audio feature by using a first transformer encoder of a trained detection model to obtain the first attention feature information; and calculating attention information of a correlation between the at least one image frame feature in the motion feature by using a second transformer encoder of the trained detection model to obtain the second attention feature information.

12. The method according to claim 10, wherein the performing consistency verification on the reflected audio signal and the video data of the object based on the first attention feature information and the second attention feature information, and determining, according to a verification result, whether the liveness detection result is correct comprises:

calculating mutual attention information between the first attention feature information and the second attention feature information by using a transformer decoder of the trained detection model; and performing consistency verification on the mutual attention information by using a verification network of the trained detection model, to obtain a verification result; and determining, when the verification result succeeds, that the liveness detection result is correct.

13. A liveness detection apparatus, comprising: at least one memory storing a computer program, and at least one processor coupled to the memory, the at least one processor being configured to execute the computer program and perform:

obtaining a reflected audio signal and video data of an object to be detected in response to receiving a liveness detection request;

performing signal processing on the reflected audio signal to obtain a processed audio signal, and performing time-frequency analysis on the processed audio signal to obtain time-frequency information of the processed audio signal;

extracting motion trajectory information of the object from the video data;

extracting features respectively from the time-frequency information and the motion trajectory information to obtain an audio feature and a motion feature of the object;

calculating first global attention information of the object according to the audio feature, and calculating second global attention information of the object according to the motion feature, the first global attention information indicating a global correlation of the audio feature, and the second global attention information indicating a global correlation of the motion feature; and fusing the first global attention information with the second global attention information to obtain fused global information, and determining a liveness detection result of the object based on the fused global information.

14. The apparatus according to claim 13, wherein the obtaining a reflected audio signal and video data of an object comprises:

transmitting an initial audio signal to the object, and receiving the reflected audio signal reflected by the object; and acquiring the video data of the object.

15. The apparatus according to claim 14, wherein the at least one processor is further configured to perform:

superimposing target audio signals of a plurality of tones to obtain a superimposed audio signal; and randomizing a carrier frequency of the superimposed audio signal, to generate the initial audio signal.

16. The apparatus according to claim 13, wherein the performing signal processing on the reflected audio signal to obtain a processed audio signal, and performing time-frequency analysis on the processed audio signal to obtain time-frequency information of the processed audio signal comprises:

performing space-domain enhancement processing on the reflected audio signal to obtain a space-domain enhancement signal; and performing signal extraction processing on the space-domain enhancement signal to obtain the processed audio signal, and performing the time-frequency analysis on the processed audio signal to obtain the time-frequency information of the processed audio signal.

17. The apparatus according to claim 16, wherein the performing space-domain enhancement processing on the reflected audio signal to obtain a space-domain enhancement signal comprises:

performing quadrature demodulation on the reflected audio signal to obtain an analytic signal; and performing the space-domain enhancement processing on the analytic signal by using a preset space-domain matrix to obtain the space-domain enhancement signal.

18. The apparatus according to claim 16, wherein the performing signal extraction processing on the space-domain enhancement signal to obtain the processed audio signal, and performing the time-frequency analysis on the processed audio signal to obtain the time-frequency information of the processed audio signal comprises:

differentiating the space-domain enhancement signal based on a time axis of the space-domain enhancement signal, to obtain a differentiated audio signal;

determining propagation time of the object in a medium based on amplitude of the differentiated audio signal;

extracting a target audio signal from the space-domain enhancement signal according to the propagation time, and performing high-pass filtering on the target audio signal to obtain the processed audio signal; and performing short time Fourier transform on the processed audio signal to obtain the time-frequency information of the processed audio signal.

19. The apparatus according to claim 13, wherein the video data comprises at least one image frame; and the extracting motion trajectory information of the object from the video data comprises:

performing key point detection on the at least one image frame in the video data to obtain key point information corresponding to the at least one image frame; and determining the motion trajectory information of the object based on the key point information of the at least one image frame.

20. A non-transitory computer-readable storage medium, storing a plurality of instructions, the instructions being loaded by at least one processor and causing the at least one processor to perform:

obtaining a reflected audio signal and video data of an object to be detected in response to receiving a liveness detection request;

performing signal processing on the reflected audio signal to obtain a processed audio signal, and performing time-frequency analysis on the processed audio signal to obtain time-frequency information of the processed audio signal;

extracting motion trajectory information of the object from the video data;

extracting features respectively from the time-frequency information and the motion trajectory information to obtain an audio feature and a motion feature of the object;

calculating first global attention information of the object according to the audio feature, and calculating second global attention information of the object according to the motion feature, the first global attention information indicating a global correlation of the audio feature, and the second global attention information indicating a global correlation of the motion feature; and fusing the first global attention information with the second global attention information to obtain fused global information, and determining a liveness detection result of the object based on the fused global information.

\* \* \* \* \*